(12) United States Patent
Sakamoto

(10) Patent No.: US 8,769,532 B2
(45) Date of Patent: Jul. 1, 2014

(54) THIN CLIENT SYSTEM, MANAGEMENT SERVER, VIRTUAL MACHINE CREATION MANAGEMENT METHOD AND VIRTUAL MACHINE CREATION MANAGEMENT PROGRAM

(75) Inventor: Yuu Sakamoto, Tokyo (JP)

(73) Assignee: NEC Corporation, Tokyo (JP)

(*) Notice: Subject to any disclaimer, the term of this patent is extended or adjusted under 35 U.S.C. 154(b) by 347 days.

(21) Appl. No.: 13/175,324

(22) Filed: Jul. 1, 2011

(65) Prior Publication Data
US 2012/0030673 A1 Feb. 2, 2012

(30) Foreign Application Priority Data
Jul. 29, 2010 (JP) ................... 2010-170992

(51) Int. Cl.
*G06F 9/455* (2006.01)
(52) U.S. Cl.
USPC ........................................................ 718/1
(58) Field of Classification Search
None
See application file for complete search history.

(56) References Cited

U.S. PATENT DOCUMENTS

| | | | |
|---|---|---|---|
| 6,959,291 B1 | 10/2005 | Armstrong et al. | |
| 8,010,719 B2 * | 8/2011 | Moriki et al. | 710/40 |
| 8,051,180 B2 * | 11/2011 | Mazzaferri et al. | 709/227 |
| 8,214,559 B2 * | 7/2012 | Moriki et al. | 710/40 |
| 8,285,849 B2 * | 10/2012 | Oeda | 709/226 |
| 8,355,407 B2 * | 1/2013 | Wookey et al. | 370/401 |
| 8,392,838 B2 * | 3/2013 | Chawla et al. | 715/748 |
| 8,429,649 B1 * | 4/2013 | Feathergill et al. | 718/1 |
| 8,468,356 B2 * | 6/2013 | Sahita et al. | 713/176 |
| 8,539,484 B1 * | 9/2013 | Offer et al. | 718/1 |
| 2007/0250833 A1 | 10/2007 | Araujo et al. | |
| 2008/0134178 A1 | 6/2008 | Fitzgerald et al. | |
| 2010/0205303 A1 * | 8/2010 | Chaturvedi et al. | 709/226 |

FOREIGN PATENT DOCUMENTS

| | | |
|---|---|---|
| EP | 1612642 A2 | 1/2006 |
| JP | 2005-115653 A | 4/2005 |
| JP | 2006018815 A | 1/2006 |
| JP | 2009-176097 A | 8/2009 |
| WO | 2010/140194 A1 | 12/2010 |

OTHER PUBLICATIONS

European Search Report for EP 11 17 5555 completed issued Dec. 15, 2011.
Japanese Office Action for JP Application No. 2010-170992 mailed on Feb. 18, 2014 with English Translation.

* cited by examiner

*Primary Examiner* — Van Nguyen
(74) *Attorney, Agent, or Firm* — Sughrue Mion, PLLC

(57) ABSTRACT

Creation of a virtual machine in a hypervisor unusable by a license for use in creating a virtual machine is provided. At least one tenant including at least one tenant terminal, a management data base which stores resource information of the tenant, at least one data center on which a virtual machine to be used by the tenant operates, and a management server including a virtual machine creation management unit which selects a hypervisor in which the virtual machine can be created based on resource information of the tenant stored in the management data base and a virtual machine creation request including predetermined requirement information for creating the virtual machine which is received from the tenant terminal are provided.

9 Claims, 37 Drawing Sheets

DATA CENTER INFORMATION STORAGE TABLE

| DATA CENTER NAME | LOCATION INFORMATION |
|---|---|
| DATA CENTER A | TOKYO |
| DATA CENTER B | WASHINGTON |
| ⋮ | ⋮ |

FIG. 7

MANAGER INFORMATION STORAGE TABLE 511

| MANAGER NAME | ADDRESS | DATA CENTER NAME (REFERENCE TO TABLE 510) |
|---|---|---|
| MANAGER A | http://manager-a.nec.co.jp | DATA CENTER A |
| MANAGER B | http://manager-b.nec.co.jp | DATA CENTER A |
| MANAGER C | http://manager-c.nec.co.us | DATA CENTER B |
| MANAGER D | http://manager-d.nec.co.us | DATA CENTER B |
| ...... | ...... | ...... |

FIG. 8

CONNECTION BROKER INFORMATION STORAGE TABLE

512

| CONNECTION BROKER NAME | ADDRESS | MANAGER NAME (REFERENCE TO TABLE 511) |
|---|---|---|
| CONNECTION BROKER A | http://connectionbroker-a.nec.co.jp | MANAGER A |
| CONNECTION BROKER B | http://connectionbroker-b.nec.co.jp | MANAGER A |
| CONNECTION BROKER C | http://connectionbroker-c.nec.co.jp | MANAGER B |
| CONNECTION BROKER D | http://connectionbroker-d.nec.co.jp | MANAGER B |
| CONNECTION BROKER E | http://connectionbroker-e.nec.co.us | MANAGER C |
| CONNECTION BROKER F | http://connectionbroker-f.nec.co.us | MANAGER C |
| CONNECTION BROKER G | http://connectionbroker-g.nec.co.us | MANAGER D |
| CONNECTION BROKER H | http://connectionbroker-h.nec.co.us | MANAGER D |
| ...... | ...... | ...... |

FIG. 10  HYPERVISOR INFORMATION STORAGE TABLE

513

| HYPERVISOR NAME | KIND OF HYPERVISOR | SERVER SPECIFICATION | MANAGER NAME (REFERENCE TO TABLE 511) |
|---|---|---|---|
| HYPERVISOR A | VMware ESX | CPU:3GHz × 16, MEMORY:16GB | MANAGER A |
| HYPERVISOR B | VMware ESX | CPU:3GHz × 16, MEMORY:16GB | MANAGER A |
| HYPERVISOR C | VMware ESX | CPU:3GHz × 16, MEMORY:16GB | MANAGER B |
| HYPERVISOR D | VMware ESX | CPU:3GHz × 16, MEMORY:16GB | MANAGER B |
| HYPERVISOR E | VMware ESX | CPU:3GHz × 16, MEMORY:16GB | MANAGER C |
| HYPERVISOR F | VMware ESX | CPU:3GHz × 16, MEMORY:16GB | MANAGER C |
| HYPERVISOR G | VMware ESX | CPU:3GHz × 16, MEMORY:16GB | MANAGER D |
| HYPERVISOR H | VMware ESX | CPU:3GHz × 16, MEMORY:16GB | MANAGER D |
| ...... | | | ...... |

FIG. 11    TEMPLATE INFORMATION STORAGE TABLE 515

| TEMPLATE NAME | CONTENTS OF TEMPLATE | HYPERVISOR NAME (REFERENCE TO TABLE 513) |
|---|---|---|
| TEMPLATE A | Windows XP, MEMORY:1GB | HYPERVISOR A, C, D, E, G, H |
| TEMPLATE B | Ubuntu 9, MEMORY:1GB | HYPERVISOR A, C, D, E, G, H |
| TEMPLATE C | Windows 7, MEMORY:2GB | HYPERVISOR A, C, E, G |
| TEMPLATE D | Ubuntu 10, MEMORY:2GB | HYPERVISOR A, C, E, G |
| TEMPLATE E | Windows XP, MEMORY:2GB | HYPERVISOR B, F |
| TEMPLATE F | Ubuntu 9, MEMORY:2GB | HYPERVISOR B, F |
| TEMPLATE G | Windows Vista, MEMORY:2GB | HYPERVISOR B, D, F, H |
| TEMPLATE H | Fedora 11, MEMORY:2GB | HYPERVISOR B, D, F, H |
| ...... | ...... | ...... |

FIG. 12

DIRECTORY INFORMATION STORAGE TABLE 514

| DIRECTORY PATH | CONNECTION BROKER NAME (REFERENCE TO TABLE 512) |
|---|---|
| o = tenant—a, c = jp | CONNECTION BROKER A, B, C, D |
| ou = sales, o = tenant—a, c = jp | CONNECTION BROKER A, B, C, D |
| cn = user—a, ou = sales, o = tenant—a, c = jp | CONNECTION BROKER A, B, C, D |
| o = tenant—b, c = jp | CONNECTION BROKER A, B, C, D |
| ou = sales, o = tenant—b, c = jp | CONNECTION BROKER A, B, C, D |
| cn = user—b, ou = sales, o = tenant—b, c = jp | CONNECTION BROKER A, B, C, D |
| o = tenant—a, c = jp | CONNECTION BROKER E, F, G, H |
| ou = sales, o = tenant—a, c = jp | CONNECTION BROKER E, F, G, H |
| cn = user—a, ou = sales, o = tenant—a, c = jp | CONNECTION BROKER E, F, G, H |
| o = tenant—b, c = jp | CONNECTION BROKER E, F, G, H |
| ou = sales, o = tenant—b, c = jp | CONNECTION BROKER E, F, G, H |
| cn = user—b, ou = sales, o = tenant—b, c = jp | CONNECTION BROKER E, F, G, H |
| …… | …… |

TO-BE-USED DATA CENTER INFORMATION STORAGE TABLE

FIG. 18

TO-BE-USED CONNECTION BROKER INFORMATION STORAGE TABLE

518

| TENANT NAME (REFERENCE TO TABLE 516) | CONNECTION BROKER NAME (REFERENCE TO TABLE 512) |
|---|---|
| TENANT A | CONNECTION BROKER A |
| TENANT A | CONNECTION BROKER B |
| TENANT A | CONNECTION BROKER C |
| TENANT A | CONNECTION BROKER E |
| ⋮ | ⋮ |

TO-BE-USED HYPERVISOR INFORMATION STORAGE TABLE

FIG. 22

TO-BE-USED TEMPLATE INFORMATION STORAGE TABLE

521

| TENANT NAME (REFERENCE TO TABLE 516) | TEMPLATE NAME (REFERENCE TO TABLE 515) |
|---|---|
| TENANT A | TEMPLATE A |
| TENANT A | TEMPLATE B |
| ⋮ | ⋮ |

FIG. 23

LICENSE INFORMATION STORAGE TABLE 522

| TENANT NAME (REFERENCE TO TABLE 521) | TEMPLATE NAME (REFERENCE TO TABLE 521) | LICENSE KEY | MULTI-TENANT COEXISTENCE DETERMINATION INFORMATION | EXPIRATION DATE | EFFECTIVE NUMBER |
|---|---|---|---|---|---|
| TENANT A | TEMPLATE A | AAAA—AAAA—AAAA—AAAA | COEXISTENCE NOT ALLOWED | NO LIMIT | 100 |
| TENANT A | TEMPLATE B | BBBB—BBBB—BBBB—BBBB | COEXISTENCE ALLOWED | NO LIMIT | NO LIMIT |
| ...... | ...... | ...... | ...... | ...... | ...... |

FIG. 24

TENANT ROUTE INFORMATION STORAGE TABLE

| TENANT NAME (REFERENCE TO TABLE 516) | DIRECTORY PATH (REFERENCE TO TABLE 514) | DOMAIN NAME | DOMAIN AUTHENTICATION INFORMATION |
|---|---|---|---|
| TENANT A | ou = sales, o = tenant-a, c = jp | tenant-a-sales | UserName: Administrator, Password: AdminPasswd |
| ...... | ...... | ...... | ...... |

519

TENANT INFORMATION STORAGE TABLE

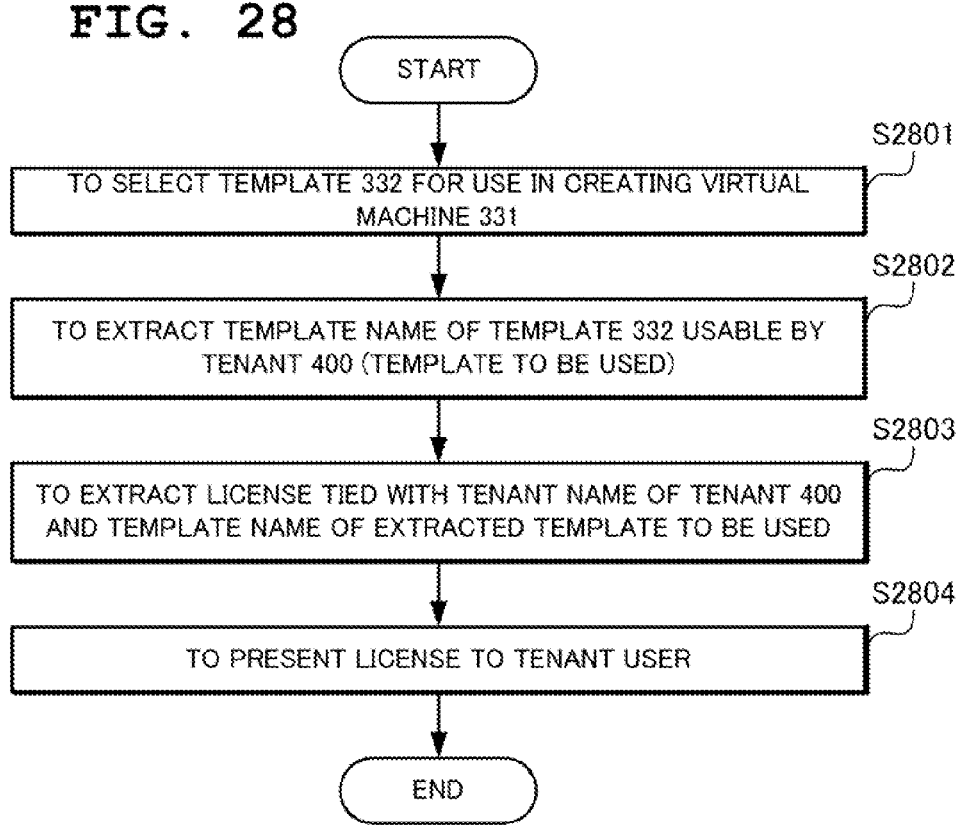
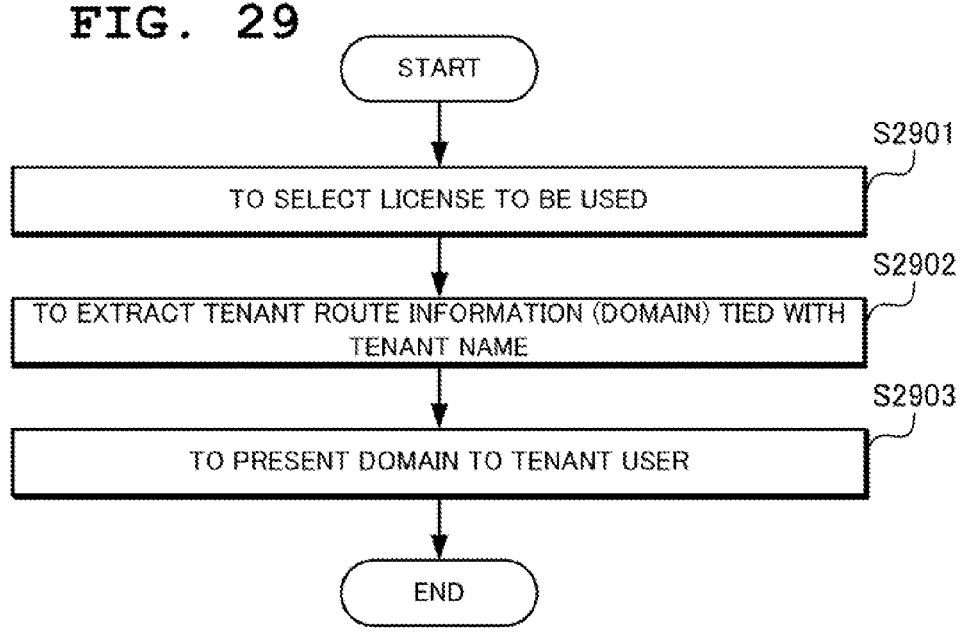

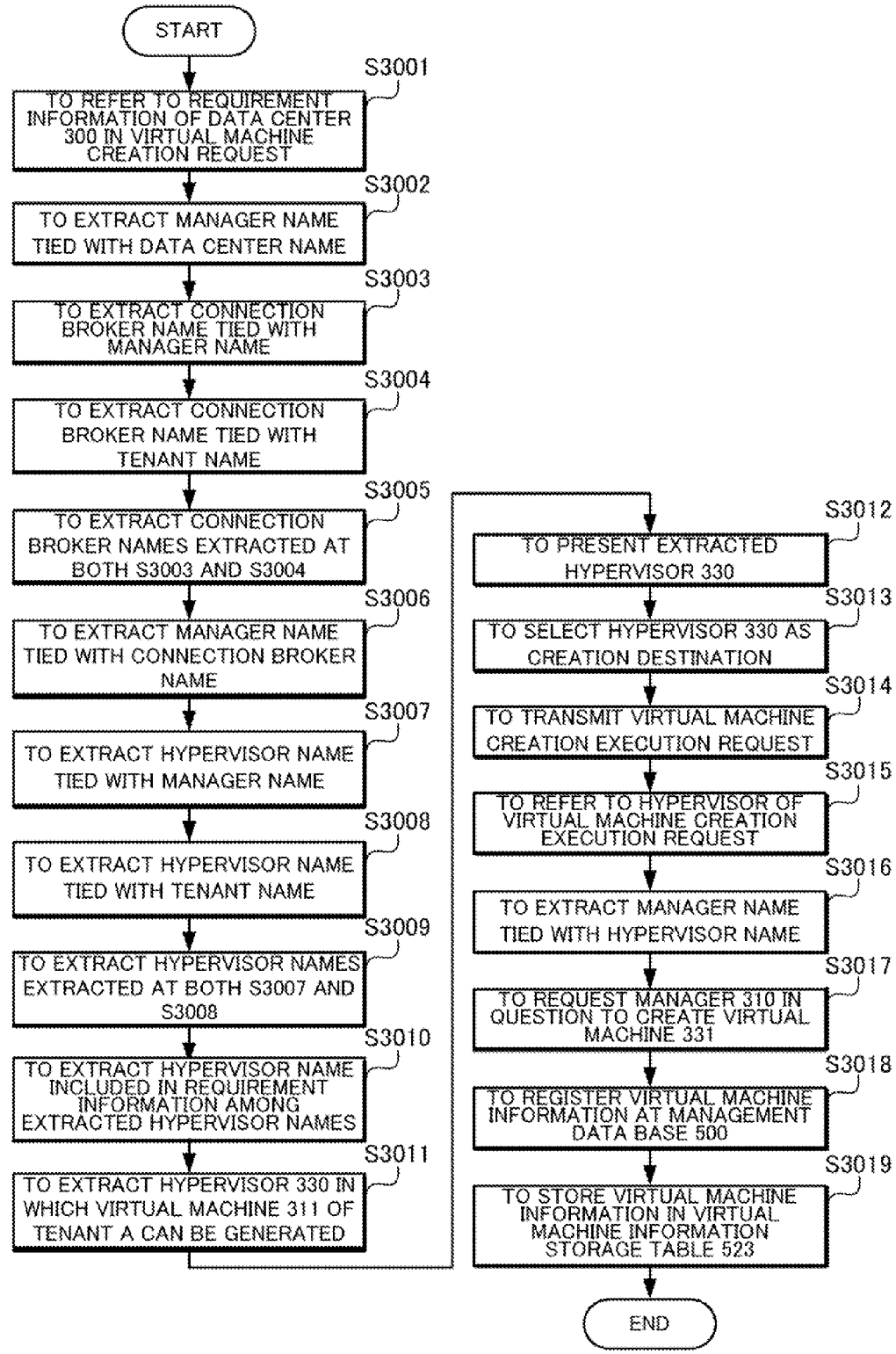

FIG. 33

TO-BE-USED HYPERVISOR INFORMATION STORAGE TABLE 520

| TENANT NAME (REFERENCE TO TABLE 516) | HYPERVISOR NAME (REFERENCE TO TABLE 513) | HYPERVISOR OWNERSHIP |
|---|---|---|
| TENANT A | HYPERVISOR A | OWN |
| TENANT A | HYPERVISOR C | OWN |
| TENANT A | HYPERVISOR E | BORROW |
| ...... | ...... | ...... |

FIG. 35

LICENSE INFORMATION STORAGE TABLE

522

| TENANT NAME (REFERENCE TO TABLE 521) | TEMPLATE NAME (REFERENCE TO TABLE 521) | LICENSE KEY | MULTI-TENANT COEXISTENCE DETERMINATION INFORMATION | EXPIRATION DATE | EFFECTIVE NUMBER | HYPERVISOR OWNER REQUIREMENT |
|---|---|---|---|---|---|---|
| TENANT A | TEMPLATE A | AAAA-AAAA-AAAA-AAAA | COEXISTENCE NOT ALLOWED | NO LIMIT | 100 | OWN ONLY |
| TENANT A | TEMPLATE B | BBBB-BBBB-BBBB-BBBB | COEXISTENCE ALLOWED | NO LIMIT | NO LIMIT | BOTH ALLOWED |
| ...... | ...... | ...... | ...... | ...... | ...... | ...... |

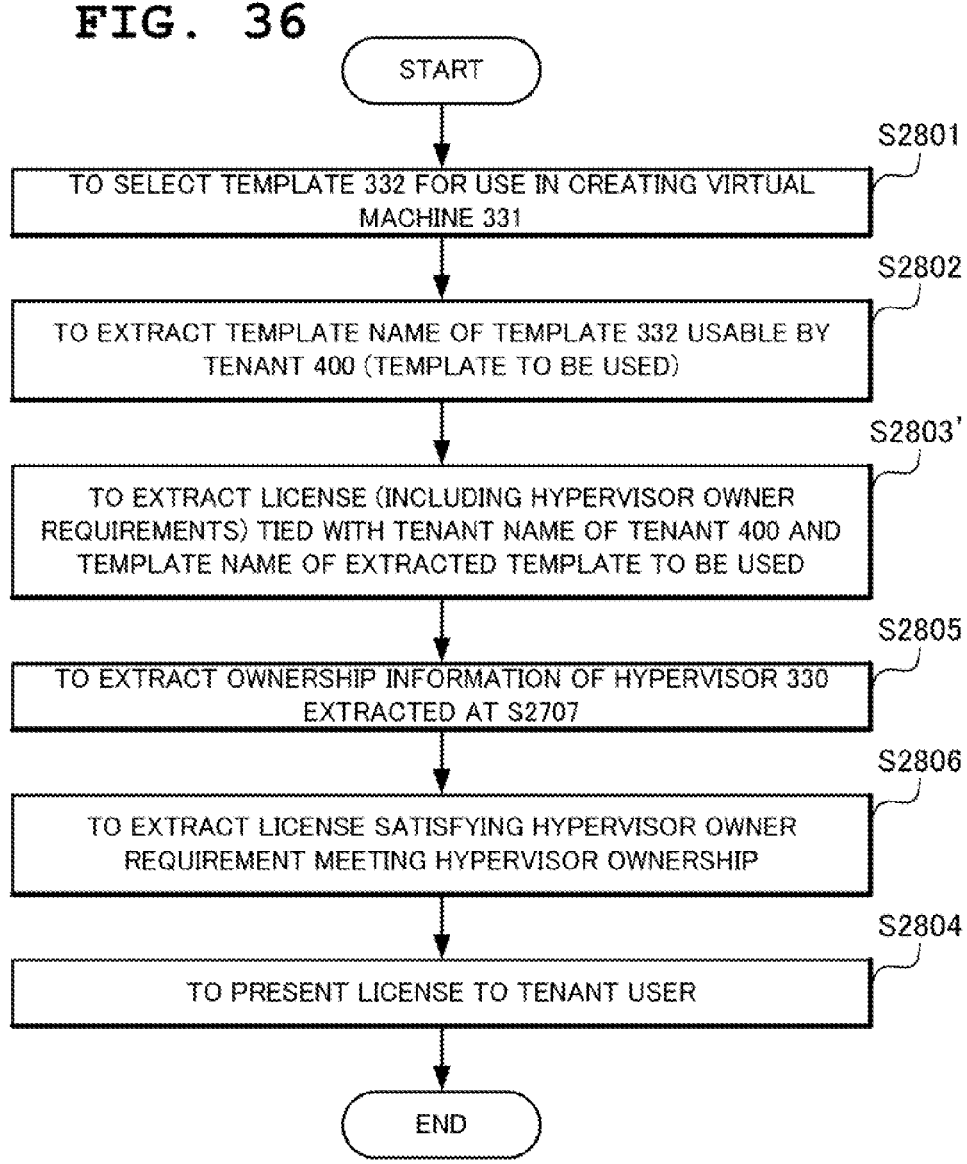

"THIN CLIENT SYSTEM, MANAGEMENT SERVER, VIRTUAL MACHINE CREATION MANAGEMENT METHOD AND VIRTUAL MACHINE CREATION MANAGEMENT PROGRAM"

INCORPORATION BY REFERENCE

This application is based upon and claims the benefit of priority from Japanese patent application No. 2010-170992, filed on Jul. 29, 2010, the disclosure of which is incorporated herein in its entirety by reference.

TECHNICAL FIELD

The present invention relates to a virtual machine creation system such as a DaaS (Desktop as a Service) system in which a hypervisor is shared by a plurality of tenants and, more particularly, a virtual machine creation system, a management server, a virtual machine creation management method and a virtual machine creation management program which enable creation of a virtual machine to be prevented in a hypervisor having no allowed license.

BACKGROUND ART

In recent years, a DaaS (Desktop as a Service) system in which a hypervisor is shared by a plurality of tenants has been attracting much attention among virtual machine creation systems. DaaS systems have advantages such as mitigation of loads on a client side and improvement of security because processing of a virtual desktop is executed on a server side.

On the other hand, the system has a shortcoming that even when a license for use in creating a virtual machine is not allowed on a hypervisor on which a virtual machine of other tenant operates, a virtual machine might be created by using the license on the hypervisor on which the virtual machine of other tenant operates.

Another problem is that even when a virtual machine is created by using the above-described license on a hypervisor on which no virtual machine of other tenant exists, a virtual machine of other tenant might be created thereafter.

Under these circumstances, recited as related art in Patent Literature 1, for example, is a technique having a mechanism of approving a software license in a virtual machine environment. The technique recited in Patent Literature 1 enables license check on a virtual machine basis.
Patent Literature 1: Japanese Patent Laying-Open No. 2006-018815.

Although the technique recited in Patent Literature 1 enables license check on a virtual machine basis, since the license check is executed for a virtual machine already created and not executed at the time of creation of a virtual machine, application of the technique recited in Patent Literature 1 fails to solve the above-described problems.

OBJECT OF THE INVENTION

An object of the present invention is to solve the above-described problems and provide a virtual machine creation system, a management server, a virtual machine creation management method and a virtual machine creation management program which enable creation of a virtual machine to be prevented in a hypervisor that cannot be used by a license for use in creation of a virtual machine.

SUMMARY

According to a first exemplary aspect of the invention, a virtual machine creation system includes at least one tenant including at least one tenant terminal, a management data base which stores resource information of the tenant, at least one data center in which a virtual machine to be used by the tenant operates, and a management server including a virtual machine creation management unit which selects a hypervisor in which the virtual machine can be created based on resource information of the tenant stored in the management data base and a virtual machine creation request including predetermined requirement information for creating the virtual machine which is received from the tenant terminal.

According to a second exemplary aspect of the invention, a management server of a virtual machine creation system includes a virtual machine creation management unit which, based on resource information of at least one tenant including at least one tenant terminal stored in a management data base of the virtual machine creation system and a virtual machine creation request including predetermined requirement information for creating a virtual machine to be used by the tenant on a data center of the virtual machine creation system which is received from the tenant terminal, selects a hypervisor in which the virtual machine can be created.

According to a third exemplary aspect of the invention, a virtual machine creation management method, includes at a management server of a virtual machine creation system, a virtual machine creation management step of, based on resource information of at least one tenant including at least one tenant terminal stored in a management data base of the virtual machine creation system and a virtual machine creation request including predetermined requirement information for creating a virtual machine to be used by the tenant on a data center of the virtual machine creation system which is received from the tenant terminal, selecting a hypervisor in which the virtual machine can be created.

According to a fourth exemplary aspect of the invention, a computer readable medium storing a virtual machine creation management program executed on a management server of a virtual machine creation system, wherein the program causes the management server to execute the functions of a virtual machine creation management processing of, based on resource information of at least one tenant including at least one tenant terminal stored in a management data base of the virtual machine creation system and a virtual machine creation request including predetermined requirement information for creating a virtual machine to be used by the tenant on a data center of the virtual machine creation system which is received from the tenant terminal, selecting a hypervisor in which the virtual machine can be created.

The present invention enables creation of a virtual machine in a hypervisor that cannot be used by a license for use in creating a virtual machine.

BRIEF DESCRIPTION OF THE DRAWINGS

FIG. 7 is a diagram showing an example of a structure of a manager information storage table according to the first exemplary embodiment;

FIG. 8 is a diagram showing an example of a structure of a connection broker information storage table according to the first exemplary embodiment;

FIG. 10 is a diagram showing an example of a structure of a hypervisor information storage table according to the first exemplary embodiment;

FIG. 11 is a diagram showing an example of a structure of a template information storage table according to the first exemplary embodiment;

FIG. 12 is a diagram showing an example of a structure of a directory information storage table according to the first exemplary embodiment;

FIG. 18 is a diagram showing an example of a structure of a to-be-used connection broker information storage table according to the first exemplary embodiment;

FIG. 22 is a diagram showing an example of a structure of a to-be-used template information storage table according to the first exemplary embodiment;

FIG. 23 is a diagram showing an example of a structure of a license information storage table according to the first exemplary embodiment;

FIG. 24 is a diagram showing an example of a structure of a tenant route information storage table according to the first exemplary embodiment;

FIG. 28 is a flow chart showing operation of requesting virtual machine creation according to the first exemplary embodiment;

FIG. 29 is a flow chart showing operation of requesting virtual machine creation according to the first exemplary embodiment;

FIG. 30 is a flow chart showing operation of requesting virtual machine creation execution according to the first exemplary embodiment;

FIG. 33 is a diagram showing an example of a structure of a to-be-used hypervisor information storage table according to the second exemplary embodiment;

FIG. 35 is a diagram showing an example of a structure of a license information storage table according to the second exemplary embodiment;

FIG. 36 is a flow chart showing operation of requesting virtual machine creation according to the second exemplary embodiment;

EXEMPLARY EMBODIMENT

Figure 1:
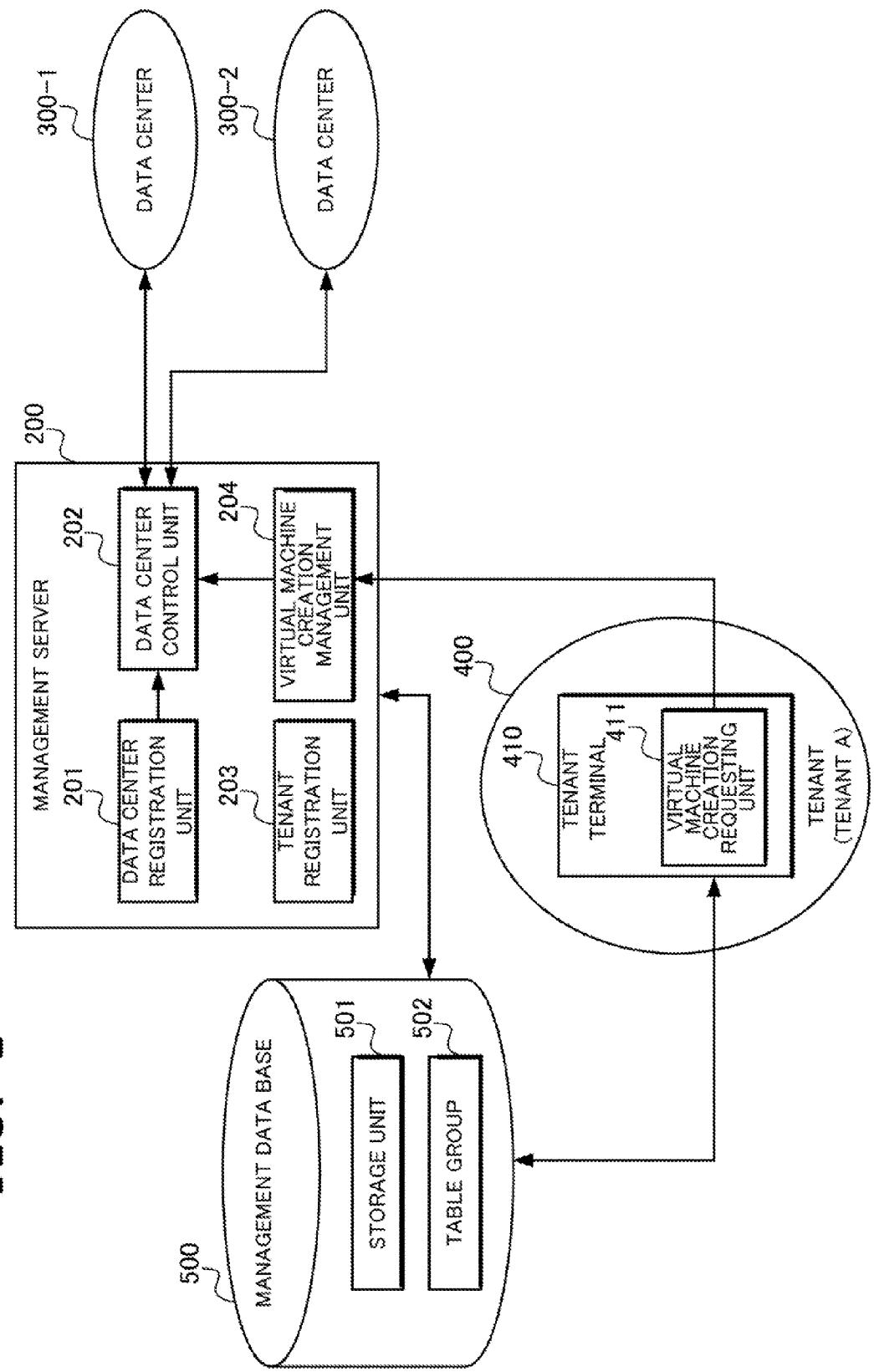
FIG. 1 is a block diagram showing a structure of a DaaS system according to a first exemplary embodiment of the present invention.

Next, detailed description will be made of exemplary embodiments of the present invention with reference to the drawings. In all the drawings, the same reference numerals are allotted to the same components to appropriately omit their description.

First Exemplary Embodiment

First, a first exemplary embodiment of the present invention will be detailed with reference to the drawings. In the following drawings, no description will be made of a component not related to the gist of the present invention and no illustration will be made of the same either.

FIG. 1 is a block diagram showing a structure of a DaaS system 100 according to the present exemplary embodiment. With reference to FIG. 1, the DaaS system 100 according to the present exemplary embodiment comprises a management server 200, a management data base 500, data centers 300-1 and 300-2 and a tenant 400.

Although it is assumed here for description's sake that the present exemplary embodiment is structured to have two data centers 300-1 and 300-2 as the data center 300 and one tenant 400, the structure is not limited thereto.

Also assume that when generically calling the data centers 300-1 and 300-2, for example, they will be appropriately referred to as the data center 300. This is also the case with the other components.

Figure 2:
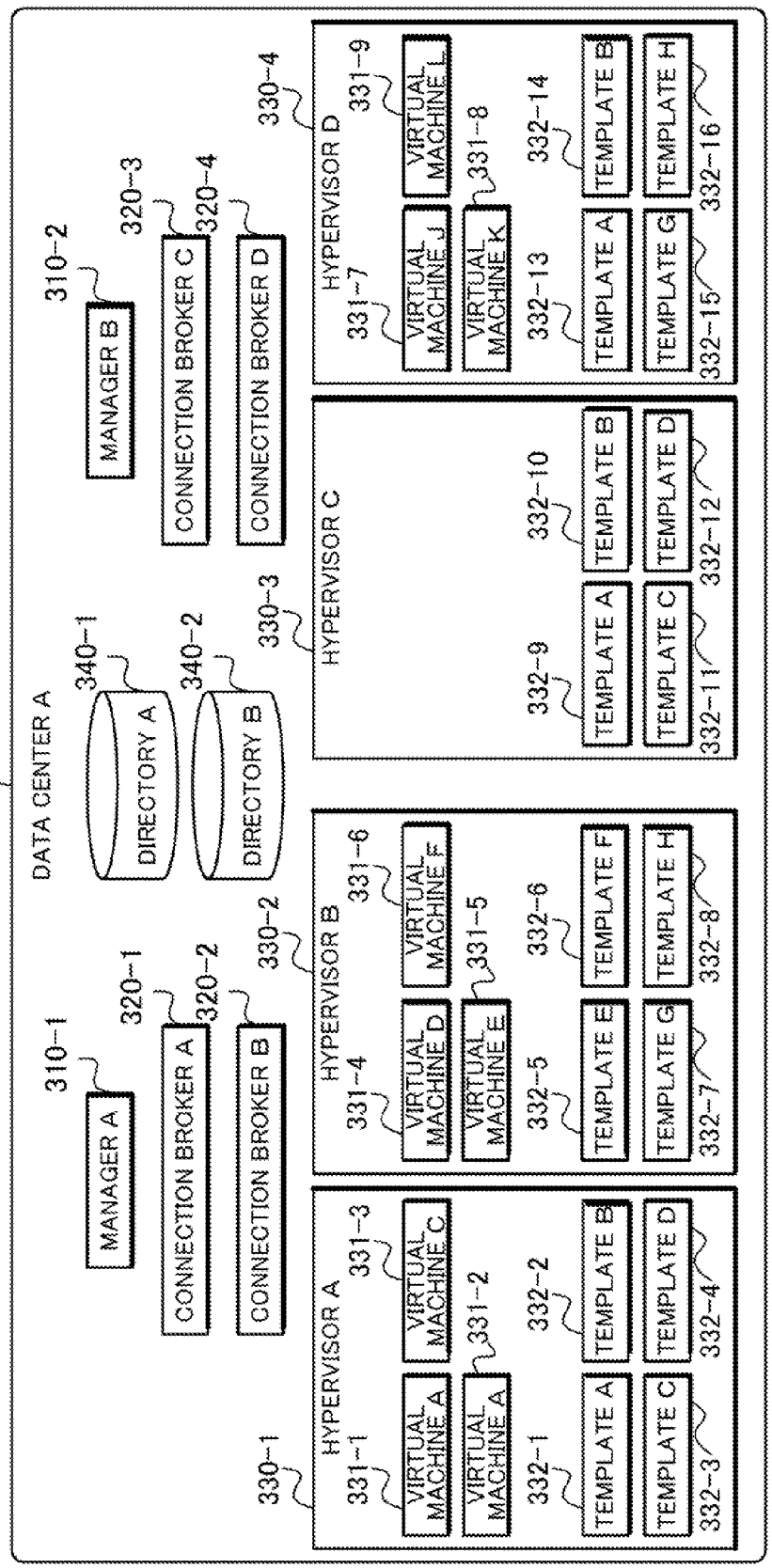
FIG. 2 is a block diagram showing a structure of a data center according to the first exemplary embodiment.
Figure 3:
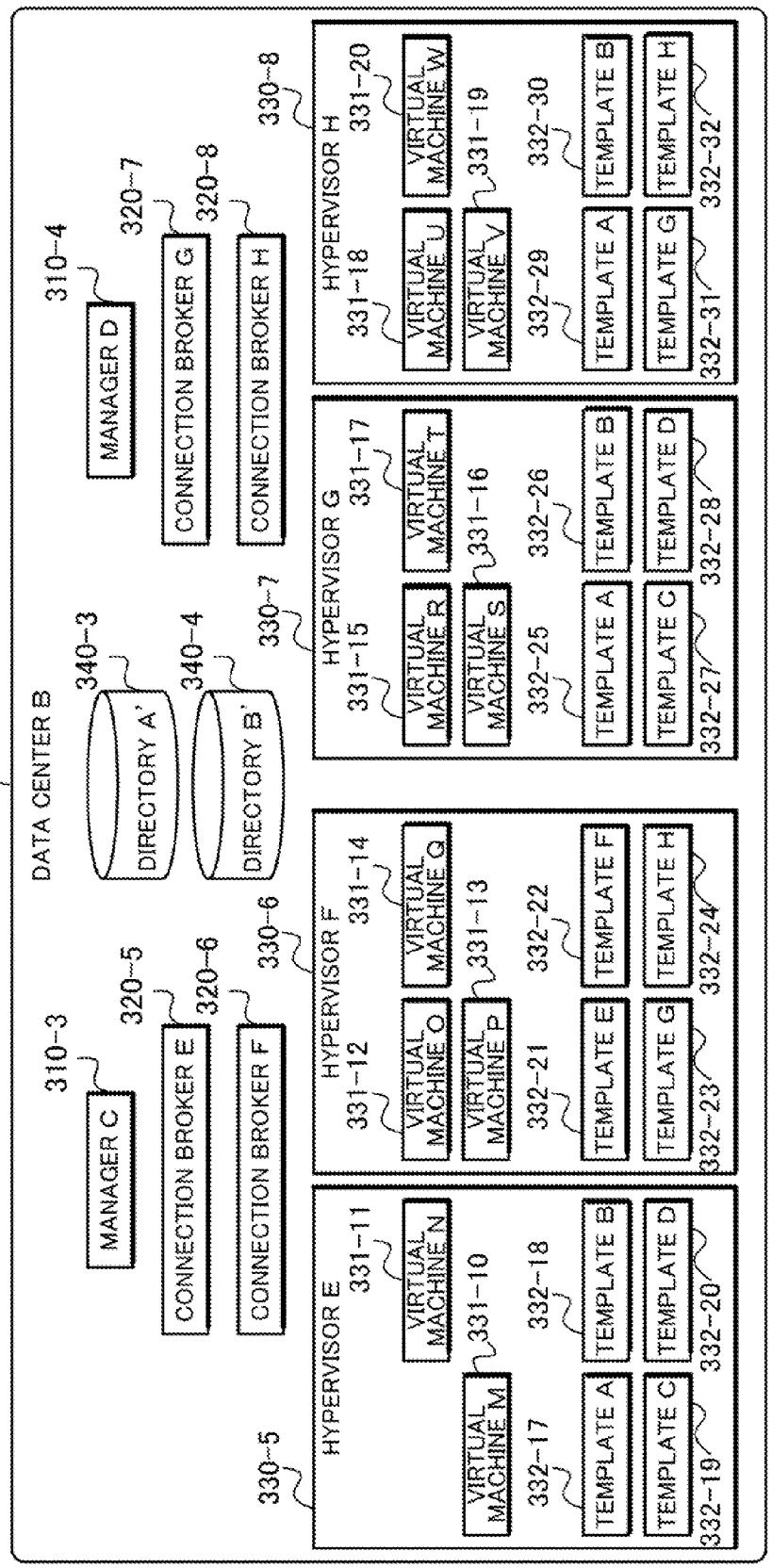
FIG. 3 is a block diagram showing a structure of a data center according to the first exemplary embodiment.

With reference to FIG. 2 and FIG. 3 here, they are block diagrams of the data center 300.

The data center 300 represents a data center where a data center server is disposed which operates a manager 310, a connection broker 320, a hypervisor 330 and a directory 340. The data center 300 is managed by a data center information storage table 510.

The manager 310 has a function of managing at least one hypervisor 330.

The manager 310 executes creation, deletion and activation/stop of a virtual machine 331 in the hypervisor 330 managed and provides information about the managed hypervisor 330.

Possibly used as the manager 310 are Sigma System Center, Microsoft System Center, VMware vCenter Server, Citrix Provisioning Server and the like, which are managed by a manager information storage table 511.

With reference to FIG. 2 and FIG. 3, a manager A manages hypervisors A and B, a manager B manages hypervisors C and D, a manager C manages hypervisors E and F and a manager D manages hypervisors G and H, respectively.

The connection broker 320, which is connected to the manager 310, has a function of controlling connection between the virtual machine 331 on the hypervisor 330 managed by the manager 310 and a virtual machine user. The connection broker 320 is managed by a connection broker information storage table 512.

The connection broker 320 refers to the contents of the directory 340 to control the connection. The connection broker 320 also provides the contents of the referred directory.

Possibly used as the connection broker 320 are Client Management Option, VMware View, Xen Desktop and the like, which are managed by the connection broker information storage table 512.

With reference to FIG. 2 and FIG. 3, connection brokers A and B are connected to the manager A to refer to directories A and B. Connection brokers C and D are connected to the manager B to refer to the directories A and B. Connection brokers E and F are connected to the manager C to refer to directories A' and B'. Connection brokers G and H are connected to the manager D to refer to the directories A' and B'.

The hypervisor 330 has a function of creating the virtual machine 331 by using designated template 332 and license.

The hypervisor 330 also has a function of managing deletion, activation and stop, etc. of the created virtual machine 331.

The hypervisor 330 also has a function of providing information about its managed virtual machine 331 and the template 332.

Used as the hypervisor 330 are VMware ESX, Hyper-V, Xen Server and the like, which are managed by a hypervisor information storage table 513.

With reference to FIG. 2 and FIG. 3, the hypervisor A manages virtual machines A, B and C and is allowed to use templates A, B, C and D.

The hypervisor B manages virtual machines D, E and F and is allowed to use templates E, F, G and H.

The hypervisor C has no virtual machine 331 existing and is allowed to use the templates A, B, C and D.

The hypervisor D manages virtual machines J, K and L and is allowed to use the templates A, B, G and H.

The hypervisor E manages virtual machines M and N and is allowed to use the templates A, B, C and D.

The hypervisor F manages virtual machines O, P and Q and is allowed to use the templates E, F, G and H.

The hypervisor G manages virtual machines R, S and T and is allowed to use the templates A, B, C and D.

The hypervisor H manages virtual machines U, V and W and is allowed to use the templates A, B, G and H.

The directory 340 has a function of providing directory service for registering and providing domain information or the like of a user allowed to use the virtual machine 331 by the tenant 400 (hereinafter referred to as a tenant user).

Possibly used as the directory 340 are Active Directory, Open LDAP and the like and each element of information held by the directory 340 is managed by a directory information storage table 514.

With reference to FIG. 2 and FIG. 3, the directories A and B are referred to by the connection brokers A, B, C and D.

The directories A' and B' are referred to by the connection brokers E, F, G and H.

The directories A' and B' are mirrors of the directories A and B, respectively, and provide the same information as that of the directories A and B.

The template 332 is used when creating the virtual machine 331 on the hypervisor 330. The template 332 includes, as contents, structure information of the virtual machine 331 to be created, information of an OS or an application to be installed into the virtual machine 331, and the like. The template 332 is managed by a template information storage table 515.

The management server 200 includes a data center registration unit 201 which registers system structure information of the data center 300 at the management data base 500, a data center control unit 202 which collects system structure information of the data center 300 and creates the virtual machine 331, a tenant registration unit 203 which registers resource information of the tenant 400 and a virtual machine creation management unit 204 which extracts the hypervisor 330 in which the virtual machine 331 is to be created.

The data center registration unit 201 has a function of registering predetermined information necessary for controlling the data center 300 at the management data base 500.

The data center registration unit 201 has a function of requesting the data center control unit 202 to collect system structure information of the data center 300 based on data center information stored in the data center information storage table 510 which will be described later.

The data center control unit 202 has a function of collecting system structure information from the data center 300 and registering the system structure information at the management data base 500 based on a request from the data center registration unit 201.

System structure information to be obtained by the data center control unit 202 here includes information of the manager 310, the connection broker 320, the hypervisor 330, the template 332, the directory 340 and the like disposed in the data center 300.

The data center control unit 202 has a function of creating the virtual machine 313 in a predetermined hypervisor 330 of the data center 300 based on a virtual machine creation execution request from the virtual machine creation management unit 204.

The tenant registration unit 203 has a function of registering resource information of the tenant 400 (hereinafter referred to as tenant information) at the management data base 500.

Here, tenant represents equivalency of so-called business office, shop and the like. Tenant information includes at least a tenant name.

The virtual machine creation management unit 204 has a function of extracting the hypervisor 330 in which the virtual machine 331 is to be created based on a virtual machine creation request received from a virtual machine creation requesting unit 411 which will be described later and predetermined information registered at the management data base 500. Details of the function will be described in the description of operation of the present exemplary embodiment.

The virtual machine creation management unit 204 has a function of sending a request for creating the virtual machine 331 in the hypervisor 330 selected by a system manager from among extracted hypervisors 330 to the data center control unit 202 as a virtual machine creation execution request.

The tenant 400 comprises a tenant terminal 410 including the virtual machine creation requesting unit 411 which requests creation of the virtual machine 331. While the present exemplary embodiment has a single tenant terminal 410 existing, it may have a plurality of terminals existing.

The virtual machine creation requesting unit 411 has a function of sending a virtual machine creation request for requesting creation of the virtual machine 331 based on predetermined information registered at the management data base 500 to the virtual machine creation management unit 204.

While the virtual machine creation requesting unit 411 is provided in the tenant terminal 410 in the present exemplary embodiment, it may be provided in the management server 200 to execute each processing on the management server 200.

The management data base 500 comprises a table group 502 which stores information registered by the data center registration unit 201, the data center control unit 202 and the tenant registration unit 203, and a storage unit 501 which stores registered information in a predetermined table of the table group 502. Information of a table of the table group 502 may be arbitrarily registered by a system manager or the like.

Figure 4:
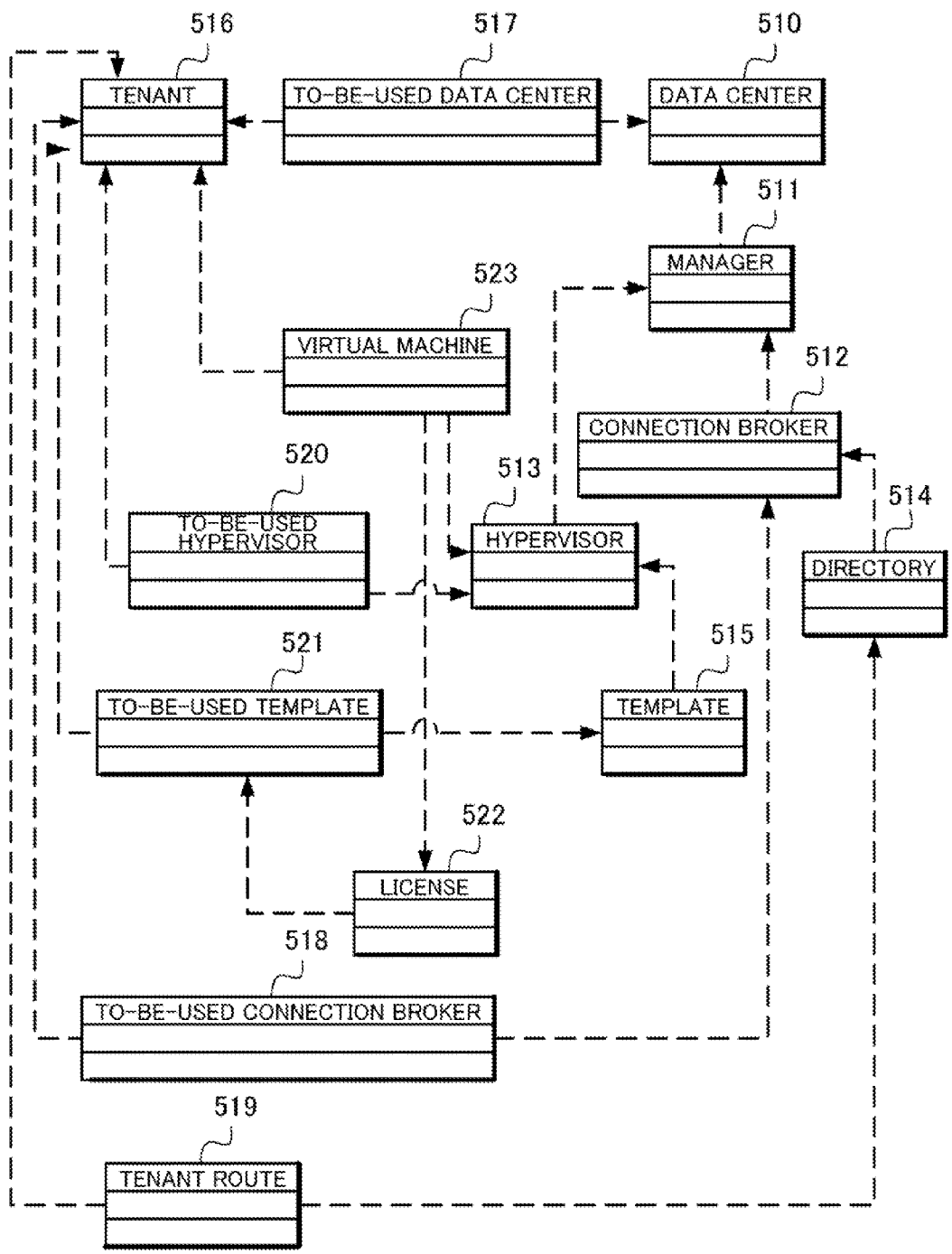
FIG. 4 is a diagram showing an example of a structure of a table group according to the first exemplary embodiment.

Here, FIG. 4 is a diagram showing an example of a structure of the table group 502.

With reference to FIG. 4, the table group 502 comprises the data center information storage table 510, the manager information storage table 511, the connection broker information storage table 512, the hypervisor information storage table 513, the directory information storage table 514, the template information storage table 515, a tenant information storage table 516, a to-be-used data center information storage table 517, a to-be-used connection broker information storage table 518, a tenant route information storage table 519, a to-be-used hypervisor information storage table 520, a to-be-used template information storage table 521, a license information storage table 522 and a virtual machine information storage table 523.

The data center information storage table 510 stores information related to a data center (hereinafter referred to as data center information).

The data center information includes at least a data center name and location information of a data center (address, GPS (Global Positioning System) coordinates, etc.).

The manager information storage table 511 stores information related to the manager 310 (hereinafter referred to as manager information).

The manager information includes at least a manager name, an address of the manager and a data center name where the manager is disposed. The data center name is stored as a reference to the data center information storage table 510.

With reference to FIG. 4 here, a broken line arrow from the manager information storage table 511 to the data center information storage table 510 indicates a reference relation in question. Similarly, broken line arrows all indicate reference relationships in FIG. 4.

For the sake of description, while the manager information storage table 511 is designed to have reference to a data center name in the present exemplary embodiment, the data center name is assumed to be information that enables unitary identification of the data center 300. The manager name is also assumed to be information that enables unitary identification of the manager 310 and this is also the case with all the other names which will be described later. In addition, while in the present exemplary embodiment, a name is assumed to be information to be referred to, the information is not limited thereto but is any information that enables unitary identification of the data center 300 and the like.

The connection broker information storage table 512 stores information related to the connection broker 320 (hereinafter referred to as connection broker information).

The connection broker information includes at least a connection broker name, an address of the connection broker and a manager name to be connected. The manager name is stored as reference to the manager information storage table 511.

The hypervisor information storage table 513 stores information related to a hypervisor that the data center 300 comprises (hereinafter referred to as hypervisor information). Hypervisor information is collected and registered by the data center control unit 202.

The hypervisor information includes at least a hypervisor name, a kind of hypervisor, a server specification and a manager name of a management source. The manager name is stored as reference to the manager information storage table 511.

The template information storage table 515 stores information related to a template (hereinafter referred to as template information).

The template information includes at least a template name, contents of the template and a hypervisor name that is allowed to use the template. The hypervisor name is stored as reference to the hypervisor information storage table 513.

The directory information storage table 514 stores information related to the directory 340 (hereinafter referred to as directory information).

The directory information includes at least a directory path which stores a domain of a tenant user or the like and a connection broker name which is allowed to refer to the directory path. The connection broker name is stored as reference to the connection broker information storage table 512.

The virtual machine information storage table 523 stores information related to a virtual machine (hereinafter referred to as virtual machine information).

The virtual machine information includes at least a virtual machine name, a tenant name that uses the virtual machine, a hypervisor name where the virtual machine is to be created and a license name used by the virtual machine.

The tenant name, the hypervisor name and the license name are stored as reference to the tenant information storage table 516, the hypervisor information storage table 513 and the license information storage table 522.

The tenant information storage table 516 stores information related to the tenant 400 (hereinafter referred to as tenant information). The tenant information includes at least a tenant name.

The to-be-used data center information storage table 517 stores information of the data center 300 that can be used by the tenant 400 (hereinafter referred to as to-be-used data center information).

The to-be-used data center information includes at least a tenant name and a data center name used by the tenant. The tenant name and the data center name are stored as reference to the tenant information storage table 516 and the data center information storage table 510, respectively.

The to-be-used connection broker information storage table 518 stores information of the connection broker 320 that can be used by the tenant 400 (hereinafter referred to as to-be-used connection broker information).

The to-be-used connection broker information includes at least a tenant name and a connection broker name used by the tenant. The tenant name and the connection broker name are stored as reference to the tenant information storage table 516 and the connection broker information storage table 512, respectively.

The tenant route information storage table 519 stores domain information of a tenant user that is allowed to use the virtual machine 331 in the tenant 400 and information about a directory path at which the domain information in question is registered (hereinafter referred to as tenant route information).

The tenant route information includes at least a tenant name, a directory path, a domain name and domain authentication information. The tenant name and the directory path are stored as reference to the tenant information storage table 516 and the directory information storage table 514, respectively.

The to-be-used hypervisor information storage table 520 stores information of the hypervisor 330 that can be used by the tenant 400 (hereinafter referred to as to-be-used hypervisor information).

The to-be-used hypervisor information includes at least a tenant name and a hypervisor name. The tenant name and the hypervisor name are stored as reference to the tenant information storage table 516 and the hypervisor information storage table 513, respectively.

The to-be-used template information storage table 521 stores information of the template 332 that can be used by the tenant 400 (hereinafter referred to as to-be-used template information).

The to-be-used template information includes at least a tenant name and a template name. The tenant name and the template name are stored as reference to the tenant information storage table 516 and the template information storage table 515, respectively.

The license information storage table 522 stores a license and information of the template 332 that uses the license (hereinafter referred to as license information).

The license information includes at least a template name that uses the license, a license key, multi-tenant coexistence determination information, expiration date and an effective number. The template name is stored as reference to-be-used template information storage table 521.

Here, the multi-tenant coexistence determination information is information indicating whether virtual machines 331 of a plurality of tenants 400 are allowed to exist on the same hypervisor 330.

The multi-tenant coexistence determination information indicating "coexistence allowed" represents that the virtual machines 331 of a plurality of tenants 400 are allowed to exist on the same hypervisor 330 and the multi-tenant coexistence determination information indicating "coexistence not allowed" represents that the virtual machines 331 of a plurality of tenants 400 are not allowed to exist on the same hypervisor 330.

(Description of Operation of the First Exemplary Embodiment)

Next, detailed description will be made of operation of the DaaS system 100 according to the present exemplary embodiment with reference to the drawings.

(Description of Operation of Registering System Structure Information of Data Center 300)

Description will be made of operation of registering system structure information of the data center 300 with reference to the drawings.

Figure 5:
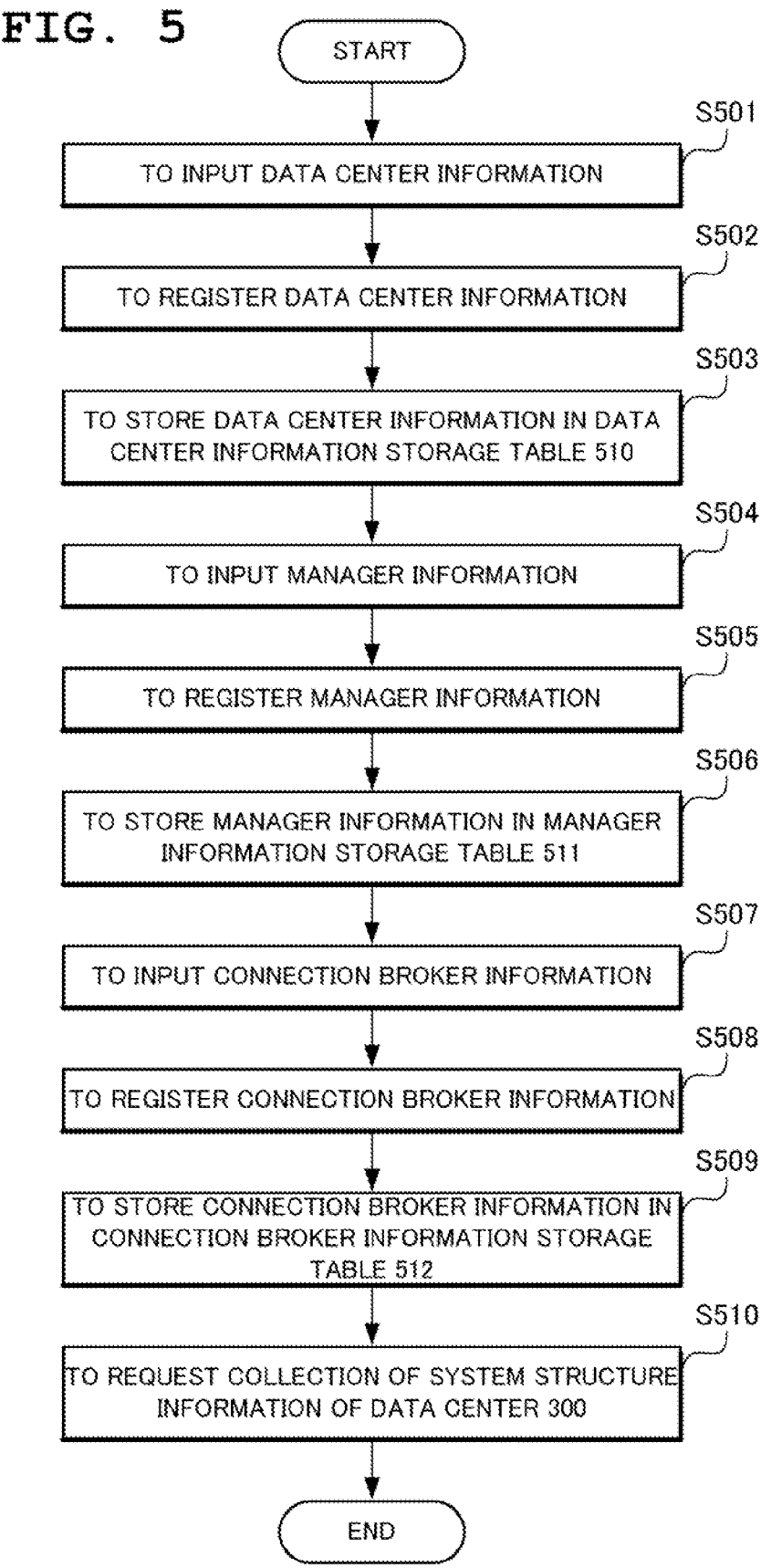
FIG. 5 is a flow chart showing operation of registration of system structure information of the data center according to the first exemplary embodiment.

FIG. 5 is a flow chart showing operation of registering system structure information of the data center 300 according to the present exemplary embodiment.

With reference to FIG. 5, first, when data center information of data centers A and B to be used in the DaaS system 100 is input by a system manager (Step S501), the data center registration unit 201 registers the data center information at the management data base 500 (Step S502).

As to the data center information, assume here that registered as data center information of the data center A are a data center name "data center A" and location information "Tokyo" and registered as data center information of the data center B are a data center name "data center B" and location information "Washington".

Next, the storage unit 501 stores the data center information in the data center information storage table 510 (Step S503).

Figure 6:
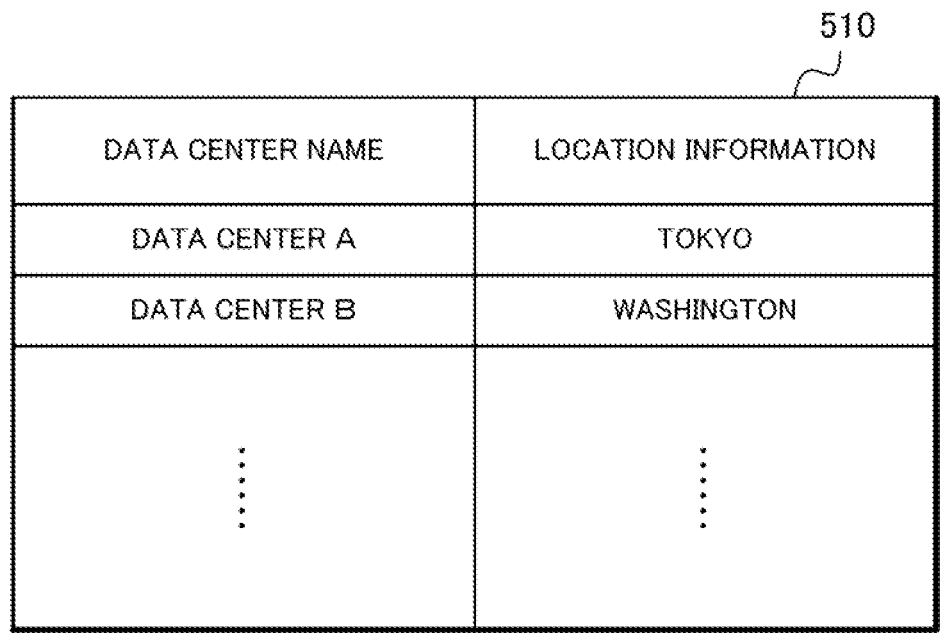
FIG. 6 is a diagram showing an example of a structure of a data center information storage table according to the first exemplary embodiment.

Here, shown in FIG. 6 is an example of a structure of the data center information storage table 510 as of after Step S503.

Next, when the manager information of the managers A through D disposed in the data centers A and B is input by the system manager (Step S504), the data center registration unit 201 registers, at the management data base 500, new manager information with the input manager information and a data center name where the manager is disposed correlated with each other (Step S505).

Assume here that registered as manager information of the manager A at Step S505 are the manager name "manager A", the address "http://manager-a.nec.co.jp" and the data center name "data center A".

Also assume that registered as manager information of the manager B are the manager name "manager B", the address "http://manager-b.nec.co.jp" and the data center name "data center A".

Also assume that registered as manager information of the manager C are the manager name "manager C", the address "http://manager-c.nec.co.us" and the data center name "data center B".

Also assume that registered as manager information of the manager D are the manager name "manager D", the address "http://manager-d.nec.co.us" and the data center name "data center B".

Next, the storage unit 501 stores the registered manager information in the manager information storage table 511 (Step S506). At this time, the storage unit 501 stores the data center name as reference to the data center information storage table 510.

Here, shown in FIG. 7 is an example of a structure of the manager information storage table 511 as of after Step S506.

Next, when the connection broker information of the connection brokers A through H connected to the registered managers A through D is input by the system manager (Step S507), the data center registration unit 201 registers, at the management data base 500, new connection broker information with the input connection broker information and a connection destination manager name correlated with each other (Step S508).

Assume here that registered as connection broker information of the connection broker A at Step S508 are the connection broker name "connection broker A", the address "http://connectionbroker-a.nec.co.jp" and the manager name "manager A".

Also assume that registered as connection broker information of the connection broker B are the connection broker name "connection broker B", the address "http://connectionbroker-b.nec.cojp" and the manager name "manager A".

Also assume that registered as connection broker information of the connection broker C are the connection broker name "connection broker C", the address "http://connection-broker-c.nec.cojp" and the manager name "manager B".

Also assume that registered as connection broker information of the connection broker D are the connection broker name "connection broker D", the address "http://connection-broker-d.nec.cojp" and the manager name "manager B".

Also assume that registered as connection broker information of the connection broker E are the connection broker name "connection broker E", the address "http://connection-broker-e.nec.co.us" and the manager name "manager C".

Also assume that registered as connection broker information of the connection broker F are the connection broker name "connection broker F", the address "http://connection-broker-f.nec.co.us" and the manager name "manager C".

Also assume that registered as connection broker information of the connection broker G are the connection broker name "connection broker G", the address "http://connection-broker-g.nec.co.us" and the manager name "manager D".

Also assume that registered as connection broker information of the connection broker H are the connection broker name "connection broker H", the address "http://connection-broker-h.nec.co.us" and the manager name "manager D".

Next, the storage unit 501 stores the connection broker information in the connection broker information storage table 512 (Step S509). At this time, the storage unit 501 stores a manager name in the form of reference to the manager information storage table 511.

Here, an example of a structure of the connection broker information storage table 512 as of after Step S509 is shown in FIG. 8.

Next, the data center registration unit 201 requests the data center control unit 202 to collect system structure information of the data centers A and B (Step S510).

In the processing executed so far, the system structure information of the data centers A and B is recorded in the management data base 500.

(Description of Operation of Collecting and Registering System Structure Information of the Data Center 300)

While with respect to the above-described Step S501 through Step S510, the description has been made of operation of registering the system structure information of the data center 300 input by the system manager, more detailed description will be here made of operation of collecting and registering the system structure information of the data center 300.

Figure 9:
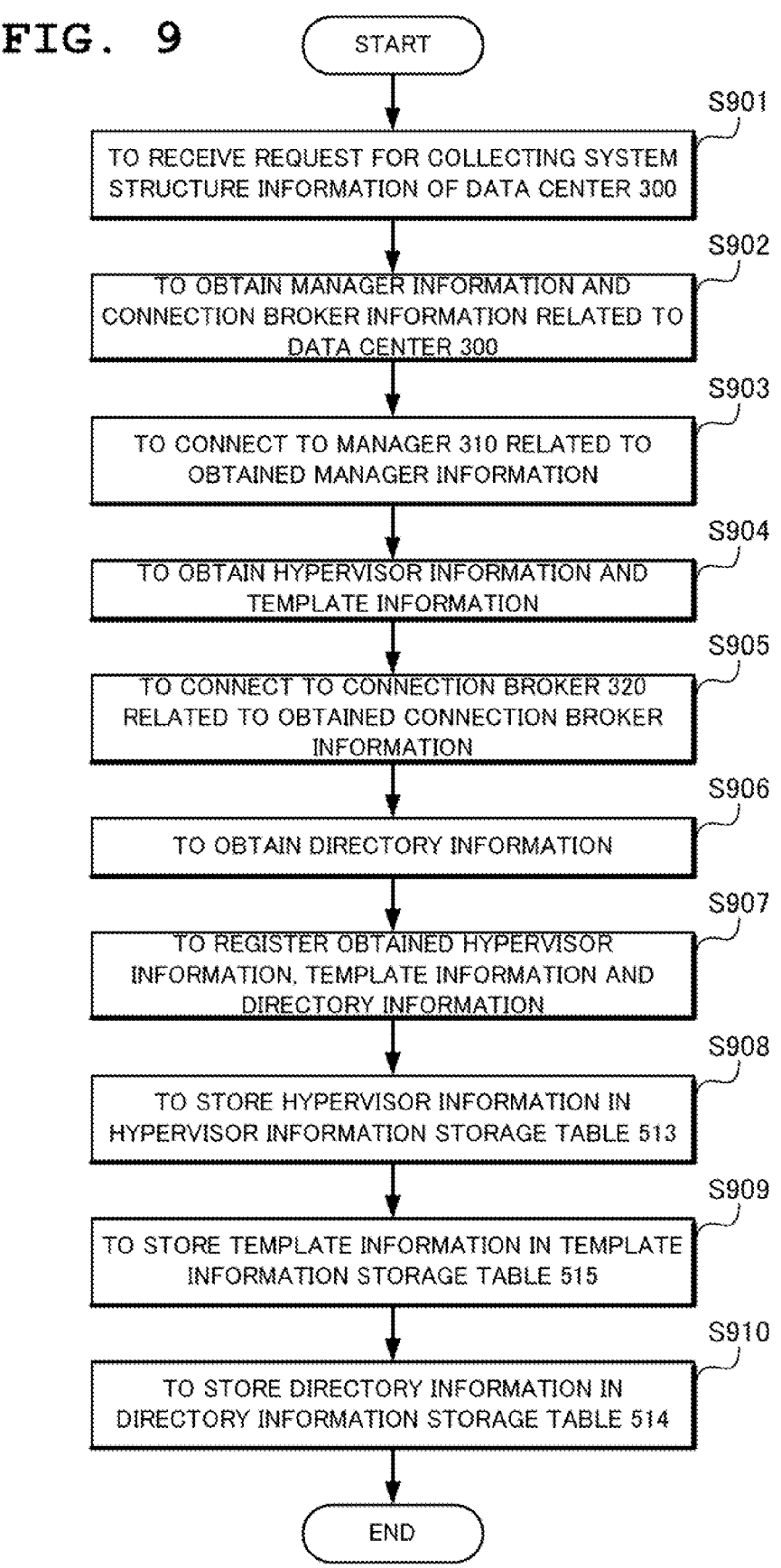
FIG. 9 is a flow chart showing operation of collecting and registering system structure information of the data center according to the first exemplary embodiment.

FIG. 9 is a flow chart showing operation of collecting and registering the system structure information of the data center 300 according to the present exemplary embodiment.

First, upon receiving a request for collecting the system structure information of the data centers A and B from the data center registration unit 201 made at Step S510 in FIG. 5 (Step S901), the data center control unit 202 refers to the data center information storage table 510, the manager information storage table 511 and the connection broker information storage table 512 of the management data base 500 to obtain manager information of the managers A through D and connection broker information of the connection brokers A through H related to the data centers A and B (Step S902).

Specific operation to be executed here is to obtain manager information having a data center name of "data center A" or "data center B". As a result, manager information of the managers A through D is obtained.

Connection broker information to be obtained is connection broker information which includes the above-obtained managers A through D as a manager name. As a result, the connection brokers A through H are obtained.

Next, the data center control unit 202 connects to the managers A through D whose manager information is obtained (Step S903) to obtain hypervisor information of the hypervisor 330 managed by the managers A through D and template information of the template 332 usable by the hypervisor 330 in question as system structure information (Step S904).

More specifically, the data center control unit 202 obtains hypervisor information of the hypervisors A and B as hypervisor information managed by the manager A, obtains hypervisor information of the hypervisors C and D as hypervisor information managed by the manager B, obtains hypervisor information of the hypervisors E and F as hypervisor information managed by the manager C and obtains hypervisor information of the hypervisors G and H as hypervisor information managed by the manager D.

Assume here that the obtained hypervisor information of the hypervisor A includes the hypervisor name "hypervisor A", a kind of hypervisor "VMware ESX", the server specification "CPU: 3 GHz×16, memory: 16 GB" and the manager name "manager A". The manager name represents a management source manager name. This is also the case in the following.

Also assume that the obtained hypervisor information of the hypervisor B includes the hypervisor name "hypervisor B", a kind of hypervisor "VMware ESX", the server specification "CPU: 3 GHz×16, memory: 16 GB" and the manager name "manager A".

Also assume that the obtained hypervisor information of the hypervisor C includes the hypervisor name "hypervisor C", a kind of hypervisor "VMware ESX", the server specification "CPU: 3 GHz×16, memory: 16 GB" and the manager name "manager B".

Also assume that the obtained hypervisor information of the hypervisor D includes the hypervisor name "hypervisor D", a kind of hypervisor "VMware ESX", the server specification "CPU: 3 GHz×16, memory: 16 GB" and the manager name "manager B".

Also assume that the obtained hypervisor information of the hypervisor E includes the hypervisor name "hypervisor E", a kind of hypervisor "VMware ESX", the server specification "CPU: 3 GHz×16, memory: 16 GB" and the manager name "manager C".

Also assume that the obtained hypervisor information of the hypervisor F includes the hypervisor name "hypervisor F", a kind of hypervisor "VMware ESX", the server specification "CPU: 3 GHz×16, memory: 16 GB" and the manager name "manager C".

Also assume that the obtained hypervisor information of the hypervisor G includes the hypervisor name "hypervisor G", a kind of hypervisor "VMware ESX", the server specification "CPU: 3 GHz×16, memory: 16 GB" and the manager name "manager D".

Also assume that the obtained hypervisor information of the hypervisor H includes the hypervisor name "hypervisor H", a kind of hypervisor "VMware ESX", the server specification "CPU: 3 GHz×16, memory: 16 GB" and the manager name "manager D".

The data center control unit 202 obtains template information of the templates A, B, C and D as template information usable by the hypervisor A, obtains template information of the templates E, F, G and H as template information usable by the hypervisor B, obtains the template information of the templates A, B, C and D as template information usable by the hypervisor C, obtains the template information of the templates A, B, G and H as template information usable by the hypervisor D, obtains the template information of the templates A, B, C and D as template information usable by the hypervisor E, obtains the template information of the templates E, F, G and H as template information usable by the hypervisor F, obtains the template information of the templates A, B, C and D as template information usable by the hypervisor G, and obtains the template information of the templates A, B, G and H as template information usable by the hypervisor H.

Assume here that the obtained template information of the template A includes the template name "template A", the contents of the template "Windows XP, memory: 1 GB", the hypervisor names "hypervisor A", "hypervisor C", "hypervisor D", "hypervisor E", "hypervisor G" and "hypervisor H". The hypervisor name represents a hypervisor name of the hypervisor 330 which uses the template A. This is also the case in the following.

Also assume that the obtained template information of the template B includes the template name "template B", the contents of the template "Ubuntu 9, memory: 1 GB", the hypervisor names "hypervisor A", "hypervisor C", "hypervisor D", "hypervisor E", "hypervisor G" and "hypervisor H".

Also assume that the obtained template information of the template C includes the template name "template C", the contents of the template "Windows 7, memory: 2 GB", the hypervisor names "hypervisor A", "hypervisor C", "hypervisor E" and "hypervisor G".

Also assume that the obtained template information of the template D includes the template name "template D", the contents of the template "Ubuntu 10, memory: 2 GB", the hypervisor names "hypervisor A", "hypervisor C", "hypervisor E" and "hypervisor G".

Also assume that the obtained template information of the template E includes the template name "template E", the contents of the template "Windows XP, memory: 2 GB", the hypervisor names "hypervisor B" and "hypervisor F".

Also assume that the obtained template information of the template F includes the template name "template F", the contents of the template "Ubuntu 9, memory: 2 GB", the hypervisor names "hypervisor B" and "hypervisor F".

Also assume that the obtained template information of the template G includes the template name "template G", the contents of the template "Windows Vista, memory: 2 GB", the hypervisor names "hypervisor B", "hypervisor D", "hypervisor F" and "hypervisor H".

Also assume that the obtained template information of the template H includes the template name "template H", the contents of the template "Fedora 11, memory: 2 GB", the hypervisor names "hypervisor B", "hypervisor D", "hypervisor F" and "hypervisor H".

Next, the data center control unit 202 connects to the connection brokers A through H whose connection broker information is obtained (Step S905) to obtain directory information of the directory 340 to which the connection brokers A through H refer as system structure information (Step S906).

More specifically, the data center control unit 202 obtains directory information of the directories A and B as directory information to which the connection brokers A through D refer and obtains directory information of the directories A' and B' as directory information to which the connection brokers E through H refer.

Since the directories A' and B' are mirrors of the directories A and B, the connection brokers E through H are substantially allowed to refer to the same directory information as that of the connection brokers A through D.

Assume here that the obtained directory information of the directory A includes directory paths "o=tenant-a, c=jp", "ou=sales, o=tenant-a, c=jp" and "cn=user-a, ou=sales, o=tenant-a, c=jp" and connection broker names "connection broker A", "connection broker B", "connection broker C" and "connection broker D". The connection broker name represents a connection broker name of the connection broker 320 which refers to the directory A. This is also the case in the following.

Also assume that the obtained directory information of the directory B includes directory paths "o=tenant-b, c=jp", "ou=sales, o=tenant-b, c=jp" and "cn=user-b, ou=sales, o=tenant-b, c=jp" and connection broker names "connection broker A", "connection broker B", "connection broker C" and "connection broker D".

Also assume that the obtained directory information of the directory A' includes directory paths "o=tenant-a, c=jp", "ou=sales, o=tenant-a, c=jp" and "cn=user-a, ou=sales, o=tenant-a, c=jp" and connection broker names "connection broker E", "connection broker F", "connection broker G" and "connection broker H".

Also assume that the obtained directory information of the directory B' includes directory paths "o=tenant-b, c=jp", "ou=sales, o=tenant-b, c=jp" and "cn=user-b, ou=sales, o=tenant-b, c=jp" and connection broker names "connection broker E", "connection broker F", "connection broker G" and "connection broker H".

Next, the data center control unit 202 registers the obtained hypervisor information, template information and directory information at the management data base 500 (Step S907).

Next, the storage unit 501 stores the registered hypervisor information in the hypervisor information storage table 513 (Step S908). At this time, the storage unit 501 stores a manager name existing in the hypervisor information in the form of reference to the manager information management table 511.

The storage unit 501 in addition stores the registered template information in the template information storage table 515 (Step S909). At this time, the storage unit 501 stores a hypervisor name existing in the template information in the form of reference to the hypervisor information storage table 513.

The storage unit 501 also stores the registered directory information in the directory information storage table 514 (Step S910). At this time, the storage unit 501 stores a connection broker name existing in the directory information in the form of reference to the connection broker information storage table 512.

Shown here in FIG. 10 through FIG. 12 are examples of structures of the hypervisor information storage table 513, the template information storage table 515 and the directory information storage table 514 as of after Steps S908 and S909.

(Description of Operation of Registering Resource Information of Tenant 400)

Figure 13:
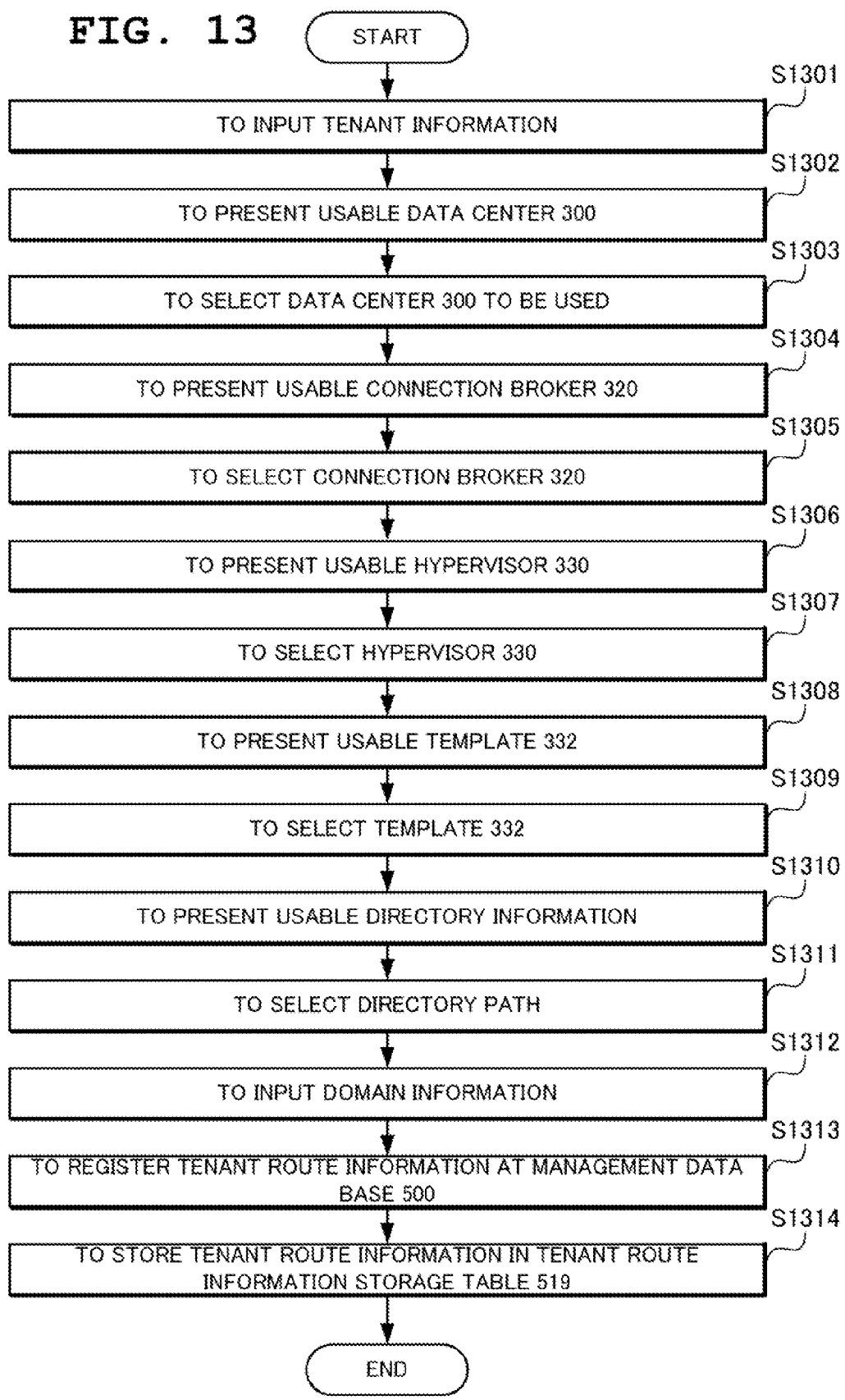
FIG. 13 is a flow chart showing operation of registering resource information of a tenant according to the first exemplary embodiment.

Next, description will be made of operation of registering resource information of the tenant 400 using the DaaS system 100 according to the present exemplary embodiment with reference to the flow chart of FIG. 13. FIG. 13 is a flow chart showing the operation of registering resource information of the tenant.

With reference to FIG. 13, first, when the system manager inputs tenant information of a tenant A which uses the DaaS system 100 (Step S1301), the tenant registration unit 203 presents the data center 300 usable by the tenant A to the system manager (Step S1302).

Here, more detailed operation of Steps S1301 and S1302 will be described with reference to the flow chart of FIG. 14.

Figure 14:
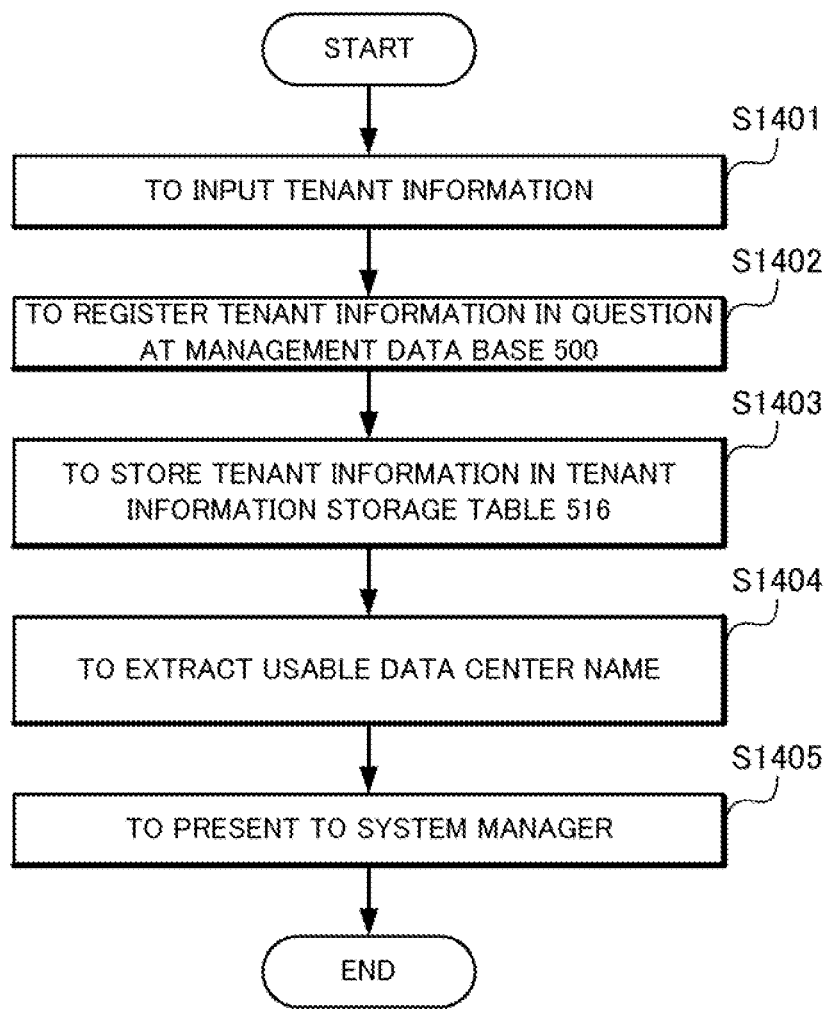
FIG. 14 is a flow chart showing operation of registering resource information of a tenant according to the first exemplary embodiment.

With reference to FIG. 14, when the system manager inputs tenant information of the tenant A (Step S1401), the tenant registration unit 203 registers the tenant information at the management data base 500 (Step S1402).

Here, the registered tenant information is assumed to be the tenant name "tenant A".

Next, the storage unit 501 stores the tenant name "tenant A" in the tenant information storage table 516 (Step S1403).

Figure 25:
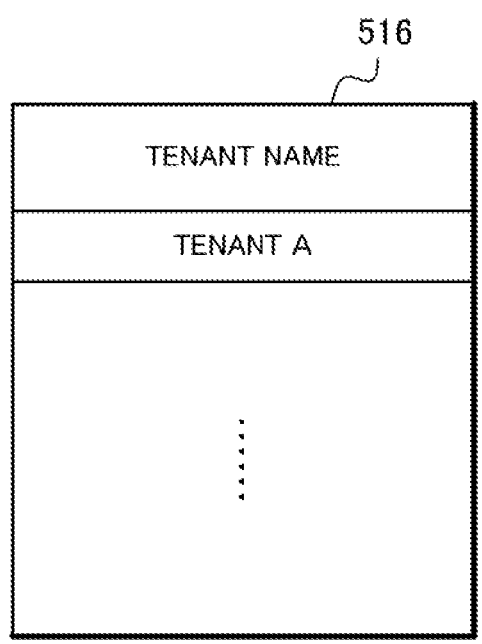
FIG. 25 is a diagram showing an example of a structure of a tenant information storage table according to the first exemplary embodiment.

Here, an example of a structure of the tenant information storage table 516 as of after Step S1403 is shown in FIG. 25.

Next, the tenant registration unit 203 refers to the data center information storage table 510, extracts the data center names "data center A" and "data center B" (Step S1404) and provides the same to the system manager (Step S1405).

As a method of the presentation here, the presentation can be realized by representation by a display, for example. This is also the case in the following. Not only a data center name but also other information stored in the data center information storage table 510 may be presented.

Subsequently, back to FIG. 13, when the system manager selects the data center 300 to be used by the registered tenant A (the tenant terminal 410 of the tenant A) from the presented data center names "data center A" and "data center B" (Step S1303), the tenant registration unit 203 presents the connection broker 320 usable by the tenant A to the system manager (Step S1304).

Here, detailed operation of Steps S1303 and S1304 will be described with reference to the flow chart of FIG. 15.

Figure 15:
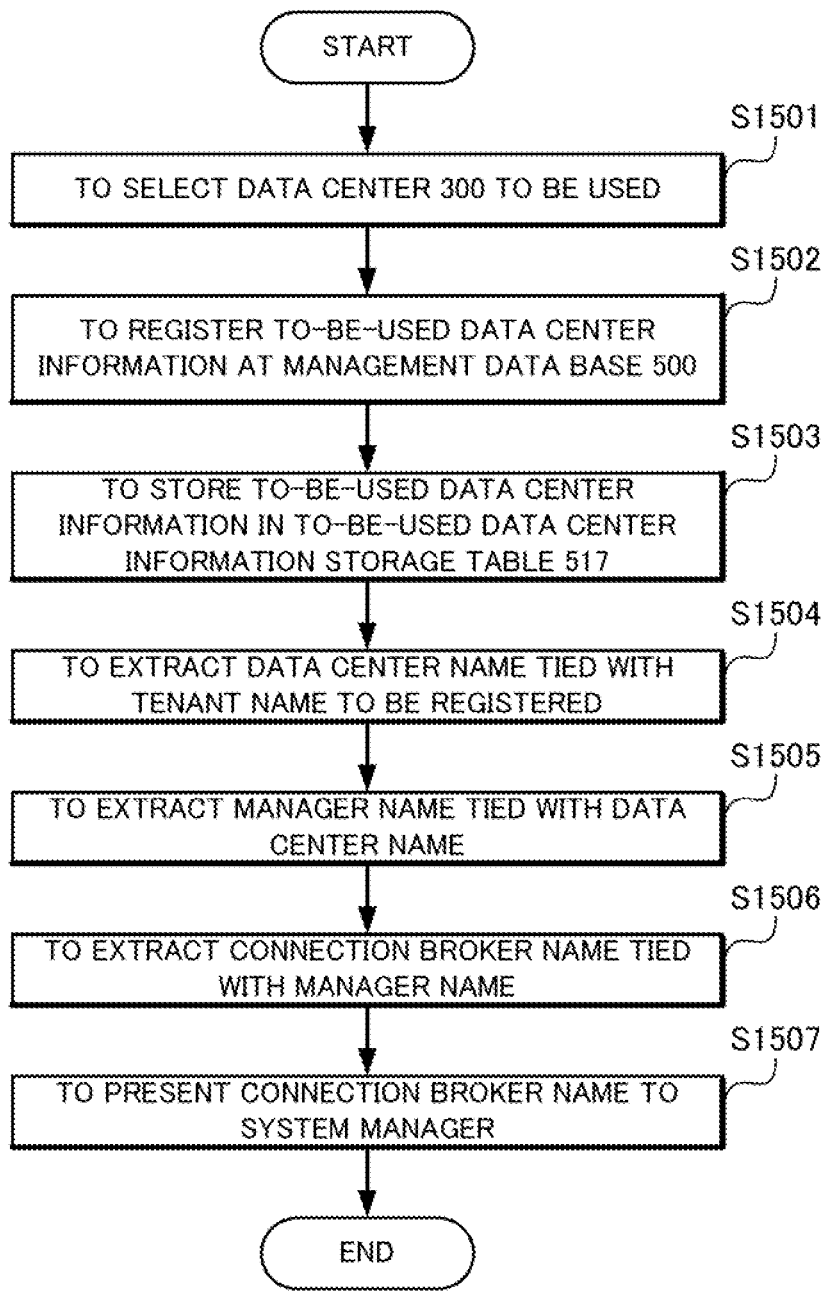
FIG. 15 is a flow chart showing operation of registering resource information of a tenant according to the first exemplary embodiment.

With reference to FIG. 15, first, when the system manager selects the data center 300 to be used by the registered tenant A (the tenant terminal 410 of the tenant A) from the presented data center names "data center A" and "data center B" (Step S1501), the tenant registration unit 203 registers, at the management data base 500, the tenant name "tenant A" of the tenant A and the data center name of the selected data center 300 so as to be correlated with each other as to-be-used data center information (Step S1502).

Here, the data center 300 selected by the system manager is assumed to be the data centers A and B. Accordingly, the registered to-be-used data center information will be the tenant name "tenant A" and the data center names "data center A" and "data center B".

Next, the storage unit 501 stores the to-be-used data center information in the to-be-used data center information storage table 517 (Step S1503).

At this time, the storage unit 501 stores the tenant name and the data center name in the form of reference to the tenant information storage table 516 and the data center information storage table 510, respectively.

Figure 16:
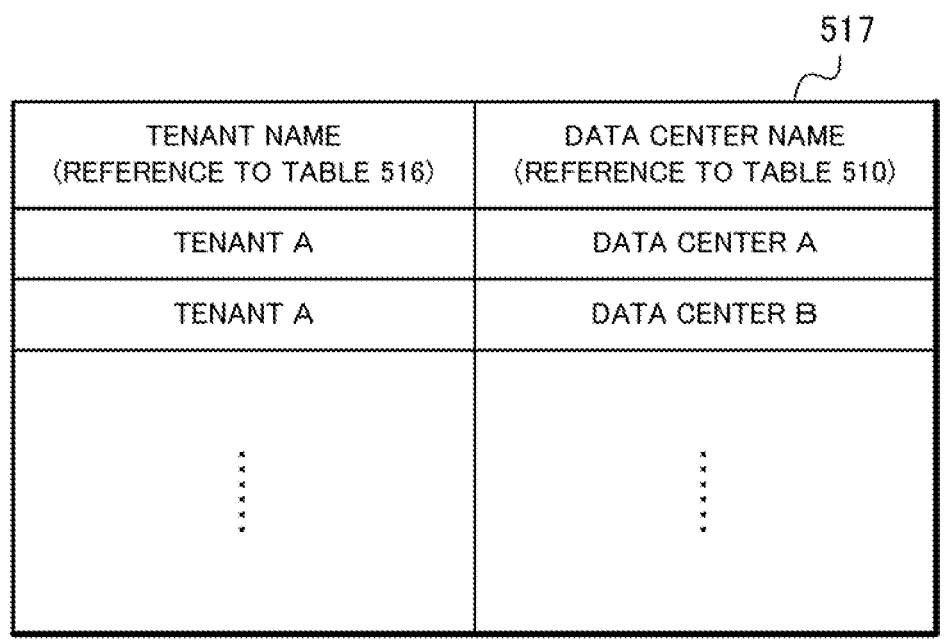
FIG. 16 is a diagram showing an example of a structure of a to-be-used data center information storage table according to the first exemplary embodiment.

Here, an example of a structure of the to-be-used data center information storage table 517 as of after Step S1503 is shown in FIG. 16.

Next, the tenant registration unit 203 extracts a data center name tied with the tenant name "tenant A" from the to-be-used data center information storage table 517 (Step S1504). As a result, the data center names "data center A" and "data center B" are extracted.

Next, the tenant registration unit 203 refers to the manager information storage table 511 to extract a manager name tied with a data center name "data center A" or "data center B" (Step S1505). As a result, the manager names "manager A", "manager B", "manager C" and "manager D" are extracted.

Next, the tenant registration unit 203 refers to the connection broker information storage table 512 to extract a connection broker name tied with any of the manager names "manager A", "manager B", "manager C" and "manager D" (Step S1506). As a result, the connection broker names "connection broker A", "connection broker B", "connection broker C", "connection broker D", "connection broker E", "connection broker F", "connection broker G" and "connection broker H" are extracted.

Next, the tenant registration unit 203 presents to the system manager the extracted connection broker names "connection broker A", "connection broker B", "connection broker C", "connection broker D", "connection broker E", "connection broker F", "connection broker G" and "connection broker H" (Step S1507).

At Step S1506, information other than a connection broker name may be extracted together and presented to the system manager.

Subsequently, back to FIG. 13, when the connection broker 320 to be used by the registered tenant A is selected from the presented connection broker information (Step S1305), the tenant registration unit 203 presents the hypervisor 330 usable by the tenant A to the system manager (Step S1306).

Here, detailed operation of Steps S1305 and S1306 will be described with reference to the flow chart of FIG. 17.

Figure 17:
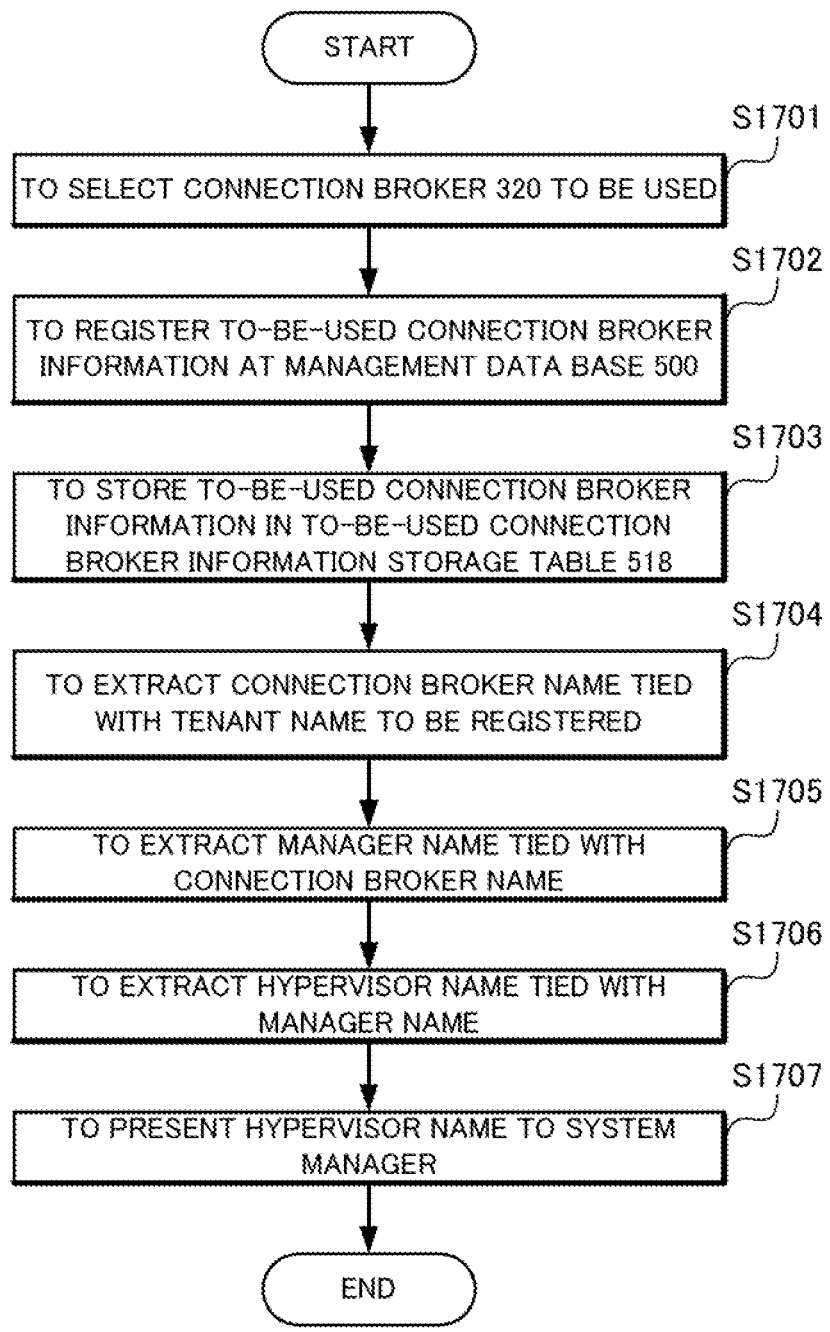
FIG. 17 is a flow chart showing operation of registering resource information of a tenant according to the first exemplary embodiment.

With reference to FIG. 17, first, when the system manager selects the connection broker 320 to be used by the registered tenant A from the presented connection broker 320 (Step S1701), the tenant registration unit 203 registers the tenant name of the tenant A and the connection broker name of the selected connection broker 320 so as to be correlated with each other as to-be-used connection broker information at the management data base 500 (Step S1702).

Assume here that the connection brokers 320 selected by the system manager are the connection brokers A, B, C and E.

Accordingly, the registered to-be-used connection broker information will be "tenant A" and "connection broker A", "tenant A" and "connection broker B", "tenant A" and "connection broker C" and "tenant A" and "connection broker E".

Next, the storage unit 501 stores the to-be-used connection broker information in the to-be-used connection broker information storage table 518 (Step S1703). At this time, the storage unit 501 stores the tenant name and the connection broker name in the form of reference to the tenant information storage table 516 and the connection broker information storage table 512, respectively.

Here, an example of a structure of the to-be-used connection broker information storage table 518 as of after Step S1703 is shown in FIG. 18.

Next, the tenant registration unit 203 refers to the to-be-used connection broker information storage table 518 to extract a connection broker name tied with the tenant name "tenant A" (Step S1704).

As a result, connection broker names "connection broker A", "connection broker B", "connection broker C" and "connection broker E" are extracted.

Next, the tenant registration unit 203 refers to the connection broker information storage table 512 to extract a manager name tied with any of the connection broker names "connection broker A", "connection broker B", "connection broker C" and "connection broker E" (Step S1705). As a result, the manager names "manager A", "manager B" and "manager C" are extracted.

Next, the tenant registration unit 203 refers to the hypervisor information storage table 513 to extract a hypervisor name tied with any of the manager names "manager A", "manager B" and "manager C" (Step S1706).

As a result, the hypervisor names "hypervisor A", "hypervisor B", "hypervisor C", "hypervisor D", "hypervisor E" and "hypervisor F" are extracted.

Next, the tenant registration unit 203 presents to the system manager the extracted hypervisor names "hypervisor A", "hypervisor B", "hypervisor C", "hypervisor D", "hypervisor E" and "hypervisor F" (Step S1707).

At Step S1706, information other than a hypervisor name may be extracted together and presented to the system manager.

Here, back to FIG. 13, subsequently when the hypervisor 330 to be used by the tenant A is selected from the presented hypervisor information (Step S1307), the tenant registration unit 203 presents the template 332 usable by the hypervisor to the system manager (Step S1308).

Here, detailed operation of Steps S1307 and S1308 will be described with reference to the flow chart of FIG. 19.

Figure 19:
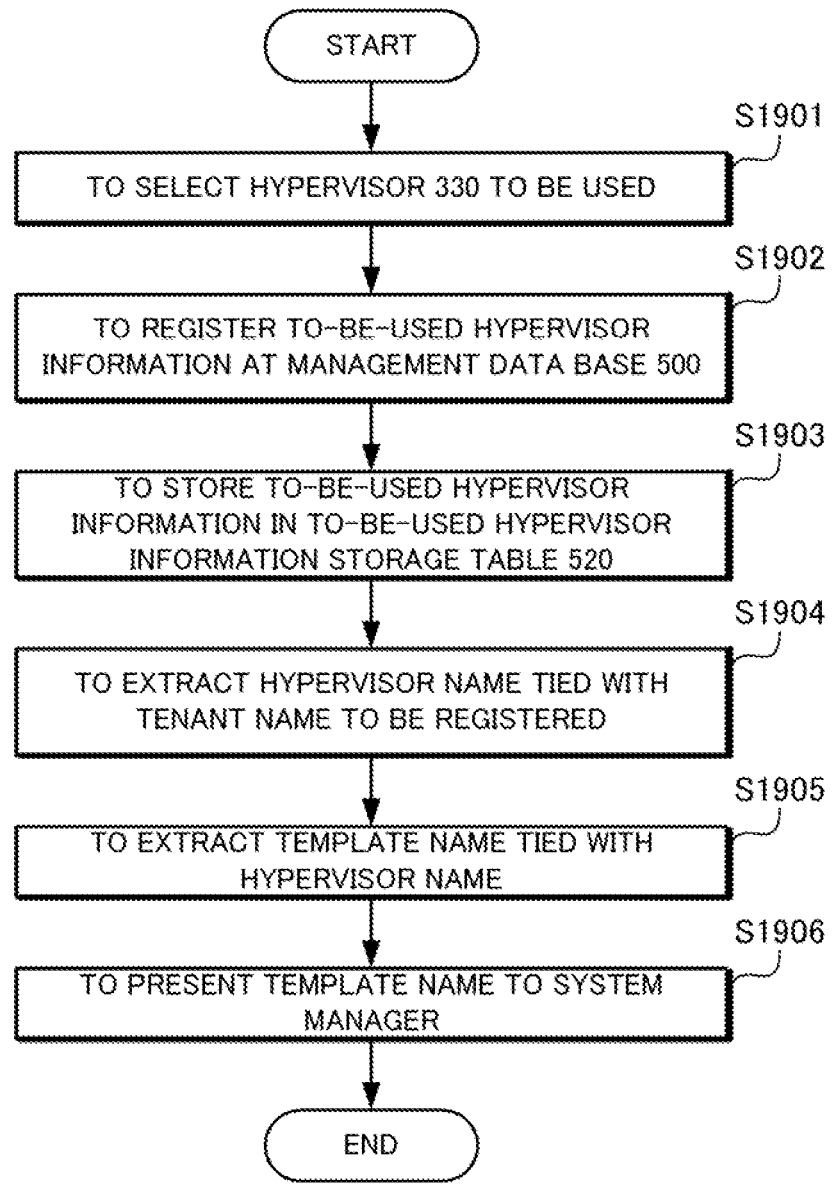
FIG. 19 is a flow chart showing operation of registering resource information of a tenant according to the first exemplary embodiment.

With reference to FIG. 19, when the system manager selects the hypervisor 330 to be used by the tenant A from the presented hypervisor information (Step S1901), the tenant registration unit 203 registers the tenant name of the tenant A and the hypervisor name of the selected hypervisor 330 so as to be correlated with each other as to-be-used hypervisor information at the management data base 500 (Step S1902).

Assume here that the hypervisors 330 selected by the system manager are the hypervisors A, C and E. Accordingly, the registered to-be-used hypervisor information will be "tenant A" and "hypervisor A", "tenant A" and "hypervisor C", and "tenant A" and "hypervisor E".

Next, the storage unit 501 stores the to-be-used hypervisor information in the to-be-used hypervisor information storage table 520 (Step S1903).

At this time, the storage unit 501 stores the tenant name and the hypervisor name in the form of reference to the tenant information storage table 516 and the hypervisor information storage table 513, respectively.

Figure 20:
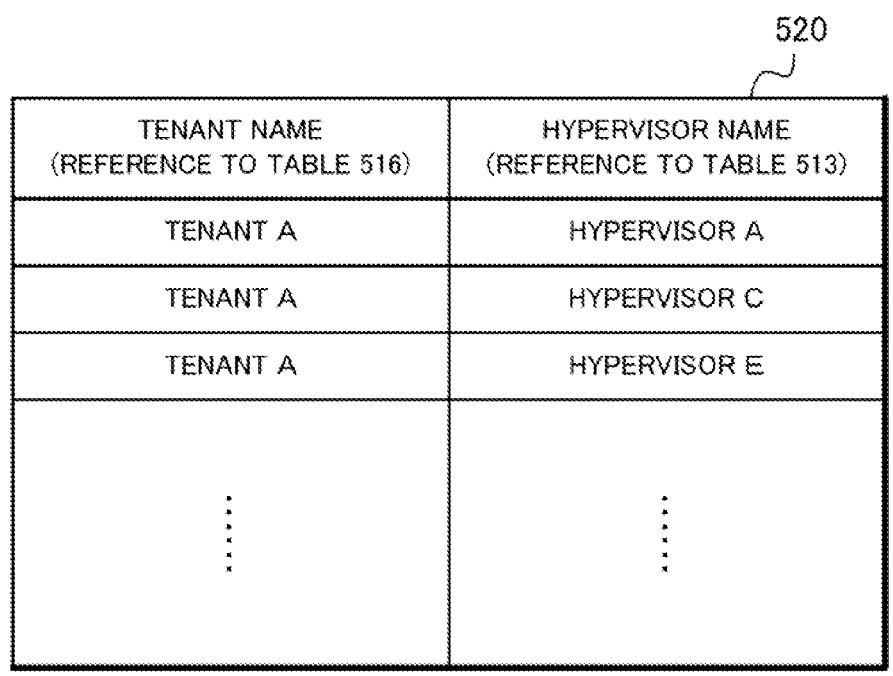
FIG. 20 is a diagram showing an example of a structure of a to-be-used hypervisor information storage table according to the first exemplary embodiment.

Here, an example of a structure of the to-be-used hypervisor information storage table 520 as of after Step S1903 is shown in FIG. 20.

Next, the tenant registration unit 203 refers to the hypervisor information storage table 510 to extract a hypervisor name tied with the tenant name "tenant A" (Step S1904). As a result, the hypervisor names "hypervisor A", "hypervisor C" and "hypervisor E" are extracted.

Next, the tenant registration unit 203 refers to the tenant information storage table 515 to extract a template name tied with any of the hypervisor names "hypervisor A", "hypervisor C" and "hypervisor E" (Step S1905). As a result, the template names "template A", "template B", "template C" and "template D" are extracted.

Next, the tenant registration unit 203 presents to the system manager the extracted "template A", "template B", "template C" and "template D" (Step S1906). At Step S1905, other information than a template name may be extracted together and presented to the system manager.

Here, back to FIG. 13, subsequently when the system manager selects the template 332 to be used by the hypervisor 330 used by the tenant A from the presented templates 332 (Step S1309), the tenant registration unit 203 presents directory information of a directory at which domain information of a tenant user of the tenant 400 can be registered to the system manager (Step S1310). Tenant user will be described later.

Here, detailed operation of Steps S1309 and S1310 will be described with reference to the flow chart of FIG. 21.

Figure 21:
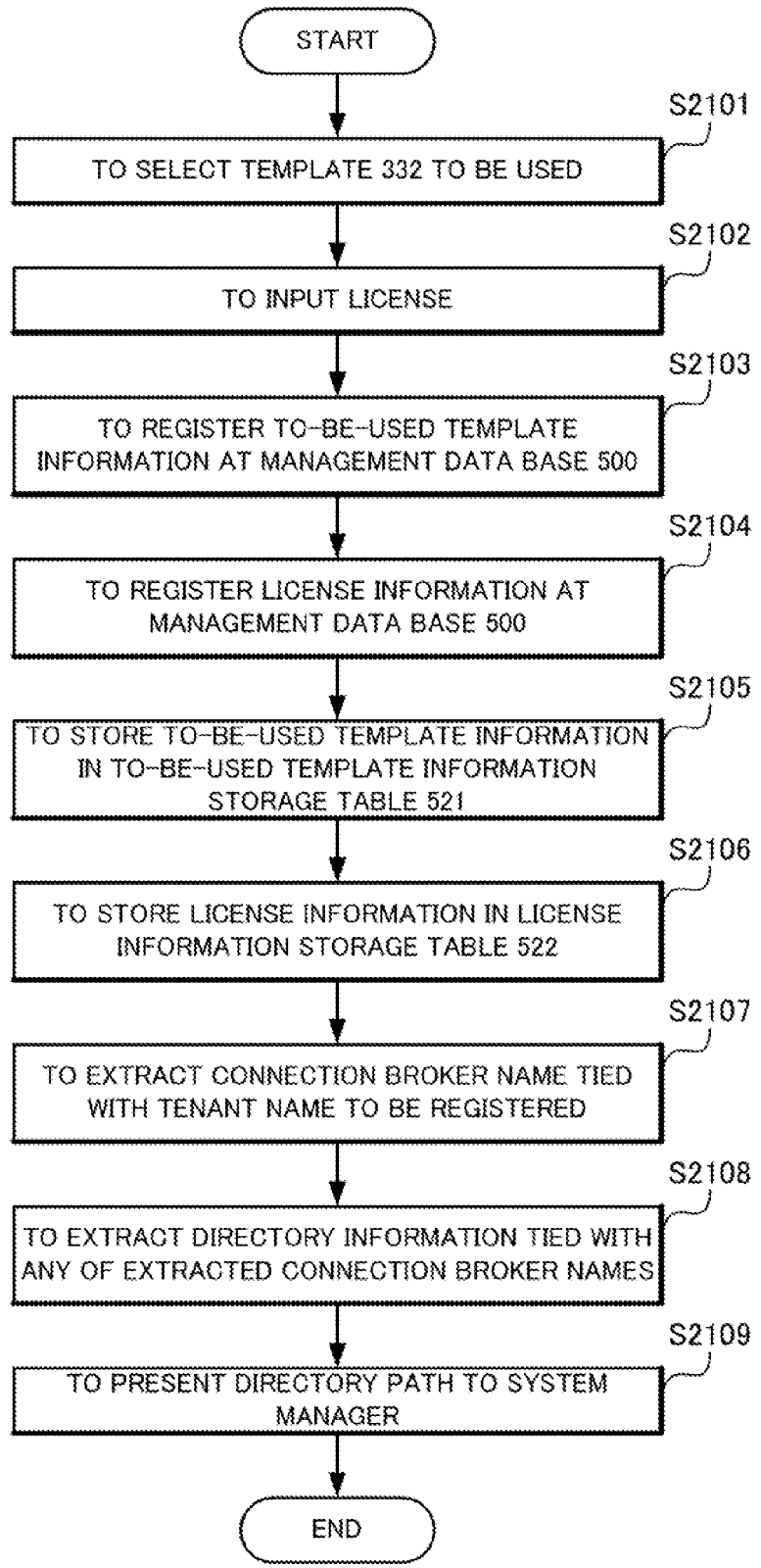
FIG. 21 is a flow chart showing operation of registering resource information of a tenant according to the first exemplary embodiment.

With reference to FIG. 21, when the system manager selects the template 332 to be used by the hypervisor 330 used by the tenant A from the presented template information (Step S2101) and further inputs a license to be used by the selected template 332 (Step S2102), the tenant registration unit 203 registers the tenant name of the tenant A and the template name of the selected template 332 so as to be correlated with each other as to-be-used template information at the management data base 500 (Step S2103), as well as registering, at the management data base 500, the tenant name of the tenant A and the template name of the selected template 332, and the input license so as to be correlated with each other as license information (Step S2104).

Here, the template 332 selected by the system manager is assumed to include the templates A and B. Accordingly, the registered to-be-used template information will be "tenant A" and "template A", and "tenant A" and "template B".

Also assume that a license to be used by the template A input by the system manager has "license key "AAAA-AAAA-AAAA-AAAA", multi-tenant coexistence determination information "coexistence not allowed", expiration date "no limit" and effective number "100"" and a license to be used by the template B has "license key "BBBB-BBBB-BBBB-BBBB", multi-tenant coexistence determination information "coexistence allowed", expiration date "no limit", and effective number "no limit"".

Accordingly, the registered license information will include "tenant A" and "template A", and license "license key "AAAA-AAAA-AAAA-AAAA", multi-tenant coexistence determination information "coexistence not allowed", expiration date "no limit" and effective number "100"", and "tenant A" and "template B", and "license key "BBBB-BBBB-BBBB-BBBB", multi-tenant coexistence determination information "coexistence allowed", expiration date "no limit" and effective number "no limit"".

Next, the storage unit stores the registered to-be-used template information in the to-be-used template information storage table 521 (Step S2105). At this time, the storage unit 501 stores the tenant name and the template name in the form of reference to the tenant information storage table 516 and the template information storage table 515, respectively.

The storage unit also stores the registered license information in the license information storage table 522 (Step S2106). At this time, the storage unit 501 stores the tenant name and the template name in the form of reference to the to-be-used template information storage table 521.

Here, examples of structures of the to-be-used template information storage table 521 and the license information storage table 522 as of after Step S2106 are shown in FIG. 22 and FIG. 23, respectively.

Next, the tenant registration unit 203 refers to the to-be-used connection broker information storage table 518 to extract a connection broker name tied with the tenant name "tenant A" (Step S2107). As a result, the connection broker names "connection broker A", "connection broker B", "connection broker C" and "connection broker E" are extracted.

Next, the tenant registration unit 203 refers to the directory information storage table 514 to extract a directory path tied with any of the connection broker names "connection broker A", "connection broker B", "connection broker C" and "connection broker E" (Step S2108). As a result, directory information whose directory path is any of "o=tenant-a, c=jp", "ou=sales, o=tenant-a, c=jp", "cn=user-a, ou=sales, o=tenant-a, c=jp", "o=tenant-b, c=jp", "ou=sales, o=tenant-b, c=jp", and "cn=user-b, ou=sales, o=tenant-b, c=jp".

Next, the tenant registration unit 203 presents the extracted directory path to the system manager (Step S2109). It is also possible to extract information other than a directory path and present the same to the system manager at Step S2108.

Here, back to FIG. 13, subsequently when a directory path indicating a route of a directory tree at which domain information of a user who is allowed to use the virtual machine 331 in the tenant 400 is registered is selected by the user from the presented directory paths (Step S1311) and the domain information is input by the system manager (Step S1312), the tenant registration unit 203 registers a tenant name of the tenant A, the selected directory path and the input domain information so as to be correlated with each other as tenant route information at the management data base 500 (Step S1313).

Assume here that the directory path selected by the system manager is "ou=sales, o=tenant-a, c=jp".

Also assume that the domain information input by the system manager is "domain name "tenant-a-sales", and domain authentication information is "UserName: Administrator, Password: AdminPasswd"".

Accordingly, the registered tenant route information will be ""tenant A", "ou=sales, o=tenant-a, c=jp", "tenant-a-sales", and "UserName: Administrator, Password: AdminPasswd"".

Next, the storage unit 501 stores the tenant route information in the tenant route information storage table 519 (Step S1314). At this time, the storage unit 501 stores the tenant name and the directory path in the form of reference to the tenant information storage table 516 and the directory information storage table 514, respectively.

Shown here in FIG. 24 is an example of a structure of the tenant route information storage table 519 as of after Step S1314.

(Description of Operation of Requesting Virtual Machine Creation)

Next, detailed description will be made of operation of requesting virtual machine creation executed by the tenant terminal 410 of the tenant 400 with reference to the drawings.

Description will be made assuming that each table of the table group 502 of the management data base 500 shows a state of the structure examples shown in FIG. 6 through FIG. 8, FIG. 10 through FIG. 12, FIG. 16, FIG. 18, FIG. 20, and FIG. 22 through FIG. 25.

Figure 26:
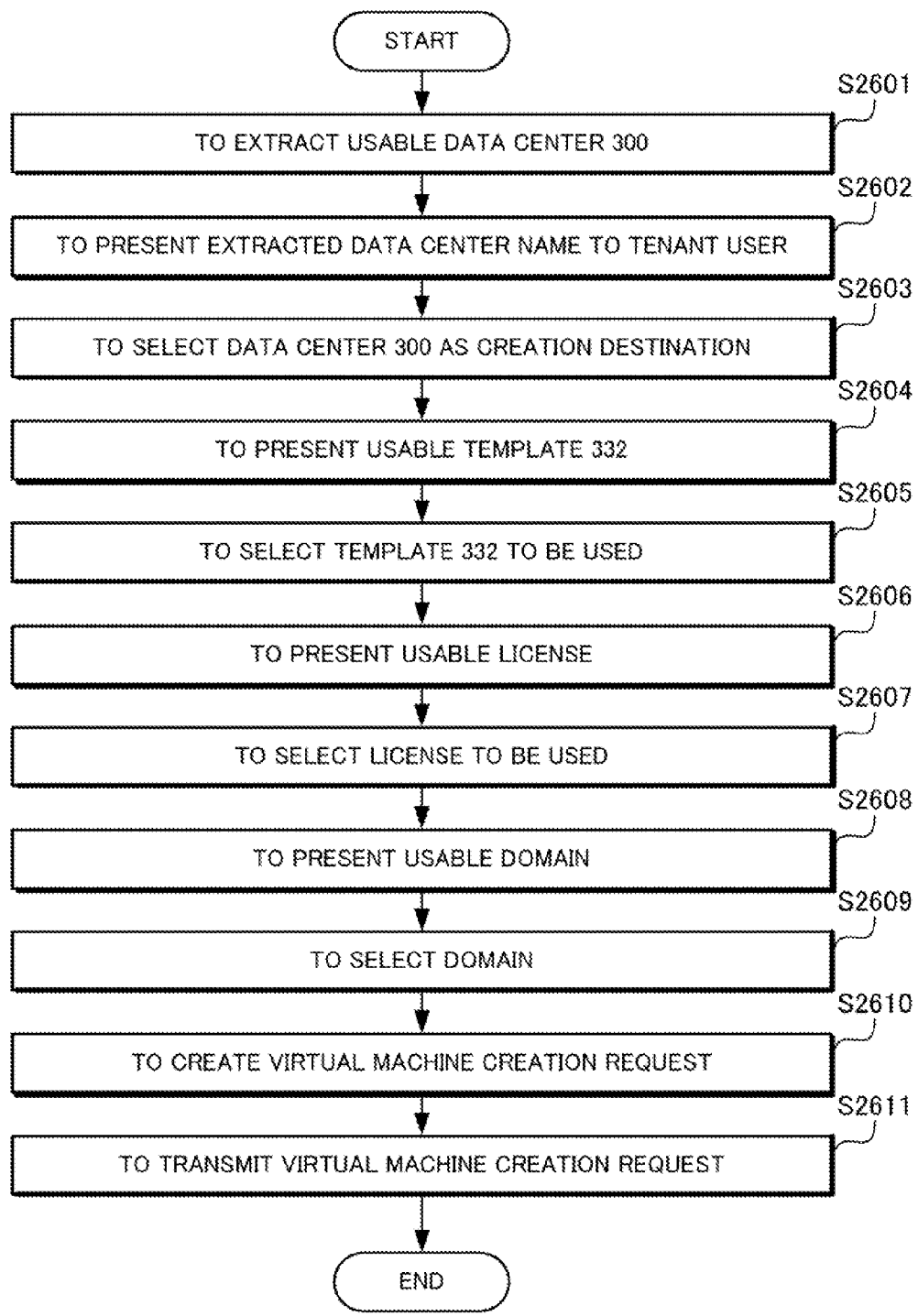
FIG. 26 is a flow chart showing operation of requesting virtual machine creation according to the first exemplary embodiment.

FIG. 26 is a flow chart showing operation of requesting virtual machine creation according to the present exemplary embodiment.

When virtual machine creation requesting is started by operation by a tenant user at the tenant terminal 410 of the tenant 400 (tenant A), first, the virtual machine creation requesting unit 411 refers to the to-be-used data center information storage table 517 to extract the data center 300 usable by the tenant A (data center name tied with the tenant name "tenant A") (Step S2601). As a result, the data center names "data center A" and "data center B" are extracted.

While the present exemplary embodiment is premised on that it is known which tenant 400 a tenant user uses, processing may be added of separately managing an account of the tenant 400, an account of the tenant terminal 410 or the like and determining a tenant based on the account or the like.

Next, the virtual machine creation requesting unit 411 presents the extracted data center names "data center A" and "data center B" to the tenant user (Step S2602). It is also possible to extract information other than the data center name together and present the same to the system manager at Step S2601.

As a method of the presentation, it can be realized by presentation by a display, for example. This is also the case in the following.

Next, when the data center 300 in which the virtual machine 331 of the tenant A is created is selected by the tenant user from the presented data center names "data center A" and "data center B" (Step S2603), the virtual machine creation requesting unit 411 presents the template 332 usable in creating the virtual machine 331 of the tenant A to the tenant user (Step S2604).

Here, detailed operation of Steps S2603 and S2604 will be described with reference to the flow chart of FIG. 27.

Figure 27:
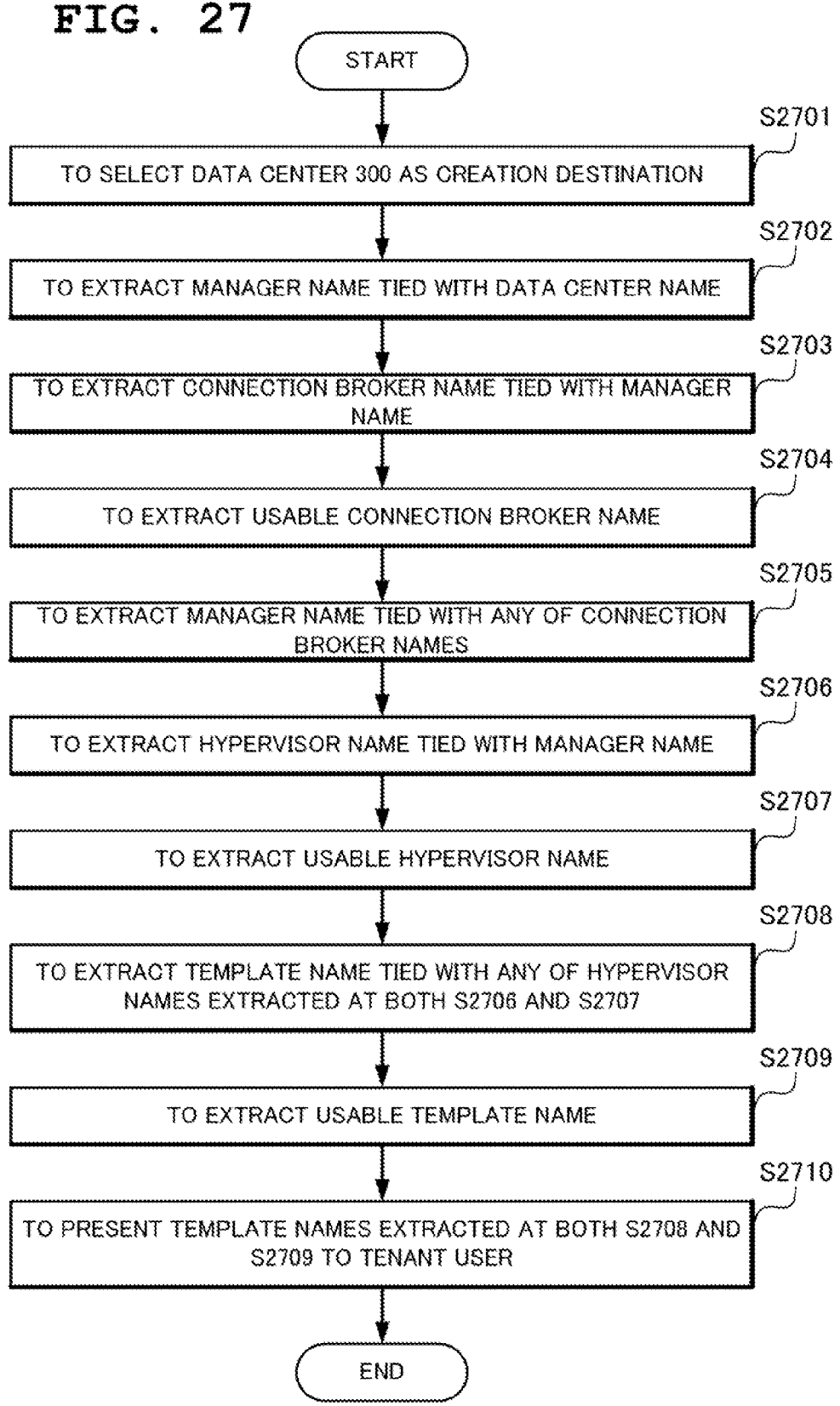
FIG. 27 is a flow chart showing operation of requesting virtual machine creation according to the first exemplary embodiment.

With reference to FIG. 27, first, when the tenant user selects the data center 300 in which the virtual machine 331 of the tenant A is created from the presented data center names "data center A" and "data center B" (Step S2701), the virtual machine creation requesting unit 411 refers to the manager information storage table 511 to extract a manager name tied with the data center name of the selected data center 300 (Step S2702).

Assume here that the data center selected by the tenant user is the "data center A". Accordingly, the manager names "manager A" and "manager B" will be extracted.

Next, the virtual machine creation requesting unit 411 refers to the connection broker information storage table 512 to extract the connection broker names tied with the manager names "manager A" and "manager B" (Step S2703). As a result, the connection broker names "connection broker A", "connection broker B", "connection broker C" and "connection broker D" are extracted.

Next, the virtual machine creation requesting unit 411 refers to the to-be-used connection broker information 218 to extract a connection broker name of a connection broker useable by the tenant A (connection broker name tied with the tenant name "tenant A") (Step S2704). As a result, the connection broker names "connection broker A", "connection broker B", "connection broker C" and "connection broker E" are extracted.

Next, the virtual machine creation requesting unit 411 refers to the connection broker information storage table 512 to extract a manager name tied with any of the connection broker names "connection broker A", "connection broker B" and "connection broker C" extracted at both of Steps S2703 and S2704 (Step S2705). As a result, the manager names "manager A" and "manager B" are extracted.

Next, the virtual machine creation requesting unit 411 refers to the hypervisor information storage table 513 to extract a hypervisor name tied with any of the manager names "manager A" and "manager B" (Step S2706). As a result, the hypervisor names "hypervisor A", "hypervisor B" and "hypervisor C" are extracted.

Next, the virtual machine creation requesting unit 411 refers to the to-be-used hypervisor information storage table 520 to extract a hypervisor name of a hypervisor usable by the tenant A (hypervisor name tied with the tenant name "tenant A") (Step S2707). As a result, the hypervisor names "hypervisor A", "hypervisor C" and "hypervisor E" are extracted.

Next, the virtual machine creation requesting unit 411 refers to the template information storage table 515 to extract a template name tied with any of the hypervisor names "hypervisor A" and "hypervisor C" extracted at both of Steps S2706 and S2707 (Step S2708). As a result, the template names "template A", "template B", "template C" and "template D" are extracted.

Next, the virtual machine creation requesting unit 411 refers to the usable template information storage table 521 to extract a template name of a template usable by the tenant A (template name tied with the tenant name "tenant A") (Step S2709). As a result, the template names "template A" and "template C" are extracted.

Next, the virtual machine creation requesting unit 411 presents the template names "template A" and "template B" extracted at both Steps S2708 and S2709 to the tenant user (Step S2710). At this time, not only a template name but also other information may be added and presented by referring to the template information storage table 205.

Here, back to FIG. 26, subsequently when the template 332 for use in creating the virtual machine 331 is selected by the tenant user from the presented template names "template A" and "template B" (Step S2605), the virtual machine creation requesting unit 411 presents a license usable in creating the virtual machine 331 of the tenant A to the tenant user (Step S2606).

Here, detailed operation of Steps S2605 and S2606 will be described with reference to the flow chart of FIG. 28.

With reference to FIG. 28, first, when the tenant user selects the template 332 for use in creating the virtual machine 331 from the presented template names "template A" and "template B" (Step S2801), the virtual machine creation requesting unit 411 refers to the to-be-used template information storage table 521 to extract a template name ("template name" tied with the tenant name "tenant A") of the template 332 usable by the tenant A (to-be-used template) (Step S2802). As a result, template names "template A" and "template B" are extracted.

Next, the virtual machine creation requesting unit 411 refers to the license information storage table 522 to extract a license tied with a to-be-used template of the tenant A (license whose tenant name is "tenant A" and whose template name is "template A" or "template B") (Step S2803). As a result, a license with a license key "AAAA-AAAA-AAAA-AAAA", multi-tenant coexistence determination information "coexistence not allowed", expiration date "no limit" and effective number "100" is extracted.

Next, the virtual machine creation requesting unit 411 presents the extracted license to the tenant user (Step S2804). As a result, the license is presented whose "license key is "AAAA-AAAA-AAAA-AAAA", multi-tenant coexistence determination information is "coexistence not allowed", expiration date is "no limit", and effective number is "100"".

In the above-described license extraction processing, it is also possible to exclude a license whose number of references from the virtual machine 311 is not less than an effective number of the license from extraction targets. This enables the effective number of licenses to be checked.

Here, back to FIG. 26, subsequently when a license for use in creating the virtual machine 331 is selected by the tenant user from the presented licenses (Step S2607), the virtual machine creation requesting unit 411 presents a domain usable by the tenant A to the tenant user (Step S2608).

Here, detailed operation of Steps S2607 and S2608 will be described with reference to the flow chart of FIG. 29.

With reference to FIG. 29, first, when the tenant user selects a license for use in creating the virtual machine 331 from the presented licenses (Step S2901), the virtual machine creation requesting unit 411 refers to the tenant route information storage table 519 to extract tenant route information (domain) of the tenant A (Step S2902).

The license selected by the tenant user is here assumed to have a license key "AAAA-AAAA-AAAA-AAAA", multi-tenant coexistence determination information "coexistence not allowed", expiration date "no limit", and effective number "100". The virtual machine creation requesting unit 411 extracts a directory path, a domain name and domain authentication information tied with the tenant name "tenant A" as a domain.

As a result, extracted is "directory path "ou=sales, o=tenant-a, c=jp", domain name "tenant-a-sales", and domain authentication information "UserName: Administrator, Password: AdminPasswd"".

Next, the virtual machine creation requesting unit 411 presents the domain to the tenant user (Step S2903).

Here, back to FIG. 26, subsequently when a domain in which the virtual machine 331 of the tenant A is to participate is selected by the tenant user (Step S2609), the virtual machine creation requesting unit 411 creates a virtual machine creation request including the data center 300, the template 332, the license and the domain already selected by the tenant user as requirement information (Step S2610).

Assume here that presented as a domain is ""ou=sales, o=tenant-a, c=jp", "tenant-a-sales", and "UserName: Administrator, Password: AdminPasswd"" and selected by the tenant user is ""ou=sales, o=tenant-a, c=jp", "tenant-a-sales", and "UserName: Administrator, Password: AdminPasswd"".

In other words, the virtual machine creation request made at Step S2610 includes, as requirement information, "data center A", "template A", "license (license key) "AAAA-AAAA-AAAA-AAAA", multi-tenant coexistence determination information "coexistence not allowed", expiration date "no limit", effective number "100"" and "domain (directory path "ou=sales, o=tenant-a, c=jp", domain name "tenant-a-sales", domain authentication information "UserName: Administrator, Password: AdminPasswd")".

Although in the present exemplary embodiment, a data center name and a template name are used as requirement information of the data center 300 and the template 332, any information, not limited to them, can be used that enables unitary identification of the data center 300 and the template 332.

Next, the virtual machine creation requesting unit 411 sends the virtual machine creation request to the virtual machine creation management unit 204 (Step S2611).

The virtual machine creation request may include not only the above-described requirement information but also a machine name of a virtual machine, an initial password or the like designated by a tenant user, for example.

(Description of Operation of Creating Virtual Machine)

Next, detailed description will be made of operation of creating a virtual machine with reference to the drawings.

Description will be made assuming that each table of the table group 502 of the management data base 500 shows a state of the structure examples illustrated in FIG. 6 through FIG. 8, FIG. 10 through FIG. 12, FIG. 16, FIG. 18, FIG. 20, and FIG. 22 through FIG. 25.

Also assume that the virtual machine creation management unit 204 has already received a virtual machine creation request from the virtual machine creation requesting unit 411 of the tenant A.

FIG. 30 is a flow chart showing operation of requesting execution of virtual machine creation according to the present exemplary embodiment.

First, when a request for execution of virtual machine creation of the tenant A is made by the system manager, the virtual machine creation management unit 204 refers to requirement information of the data center 300 in the virtual machine creation request (Step S3001). As a result, the data center name "data center A" is referred to.

Here, while in the present exemplary embodiment, the processing of the above-described Step S3001 is started with an instruction from the system manager as trigger, the processing can be started automatically. For example, it is possible to automatically execute processing in the order of reception of a virtual machine creation request from the virtual machine creation requesting unit 411 or with "desired completion time and date" designated by the tenant user added to requirement information of the virtual machine creation request, automatically execute the processing in order starting with the latest "desired completion time and date".

Next, the virtual machine creation management unit 204 refers to the manager information storage table 511 to extract a manager name tied with the data center name "data center A" (Step S3002). As a result, the manager names "manager A" and "manager B" are extracted.

Next, the virtual machine creation management unit 204 refers to the connection broker storage table 512 to extract a connection broker name tied with the extracted manager names "manager A" and "manager B" (Step S3003). As a result, the connection broker names "connection broker A", "connection broker B", "connection broker C" and "connection broker D" are extracted.

Next, the virtual machine creation management unit 204 refers to the to-be-used connection broker information reference table 518 to extract connection broker information tied with the tenant name "tenant A" (Step S3004). As a result, the connection broker names "connection broker A", "connection broker B", "connection broker C" and "connection broker E" are extracted.

Next, the virtual machine creation management unit 204 extracts connection broker names extracted at both of Steps S3003 and S3004 (Step S3005). As a result, the connection broker names "connection broker A", "connection broker B" and "connection broker C" are extracted.

Next, the virtual machine creation management unit 204 again refers to the connection broker storage table 512 to extract manager names tied with the extracted connection broker names "connection broker A", "connection broker B" and "connection broker C" (Step S3006). As a result, the manager names "manager A" and "manager B" are extracted.

Next, the virtual machine creation management unit 204 refers to the hypervisor information storage table 513 to extract hypervisor names tied with the manager names "manager A" and "manager B" (Step S3007). As a result, the hypervisor names "hypervisor A", "hypervisor B", "hypervisor C" and "hypervisor D" are extracted.

Next, the virtual machine creation management unit 204 refers to the to-be-used hypervisor information storage table 520 to extract hypervisor names tied with the tenant name "tenant A" (Step S3008). As a result, the hypervisor names "hypervisor A", "hypervisor C" and "hypervisor E" are extracted.

Next, the virtual machine creation management unit 204 extracts the hypervisor names extracted at both Steps S3007 and S3008 (Step S3009). As a result, the hypervisor names "hypervisor A" and "hypervisor C" are extracted.

Next, the virtual machine creation management unit 204 extracts the hypervisor 330 which is allowed to use the "template A" included in requirement information among the hypervisor A and the hypervisor C extracted at Step S3009 (Step S3010).

More specifically, the virtual machine creation management unit 204 refers to the template information storage table 515 to confirm that the hypervisor names "hypervisor A" and "hypervisor C" are tied with the template name "template A".

As a result, since both of the hypervisor names "hypervisor A" and "hypervisor C" are tied with the template name "template A", both the hypervisor A and the hypervisor C are extracted as the hypervisor 330 that is allowed to use the template A.

Next, the virtual machine creation management unit 204 extracts the hypervisor 330 in which the virtual machine 311 of the tenant A can be created from the hypervisors 330 extracted at Step S3010 (Step S3011).

Here, detailed processing of Step S3011 will be described with reference to the flow chart of FIG. 31.

Figure 31:
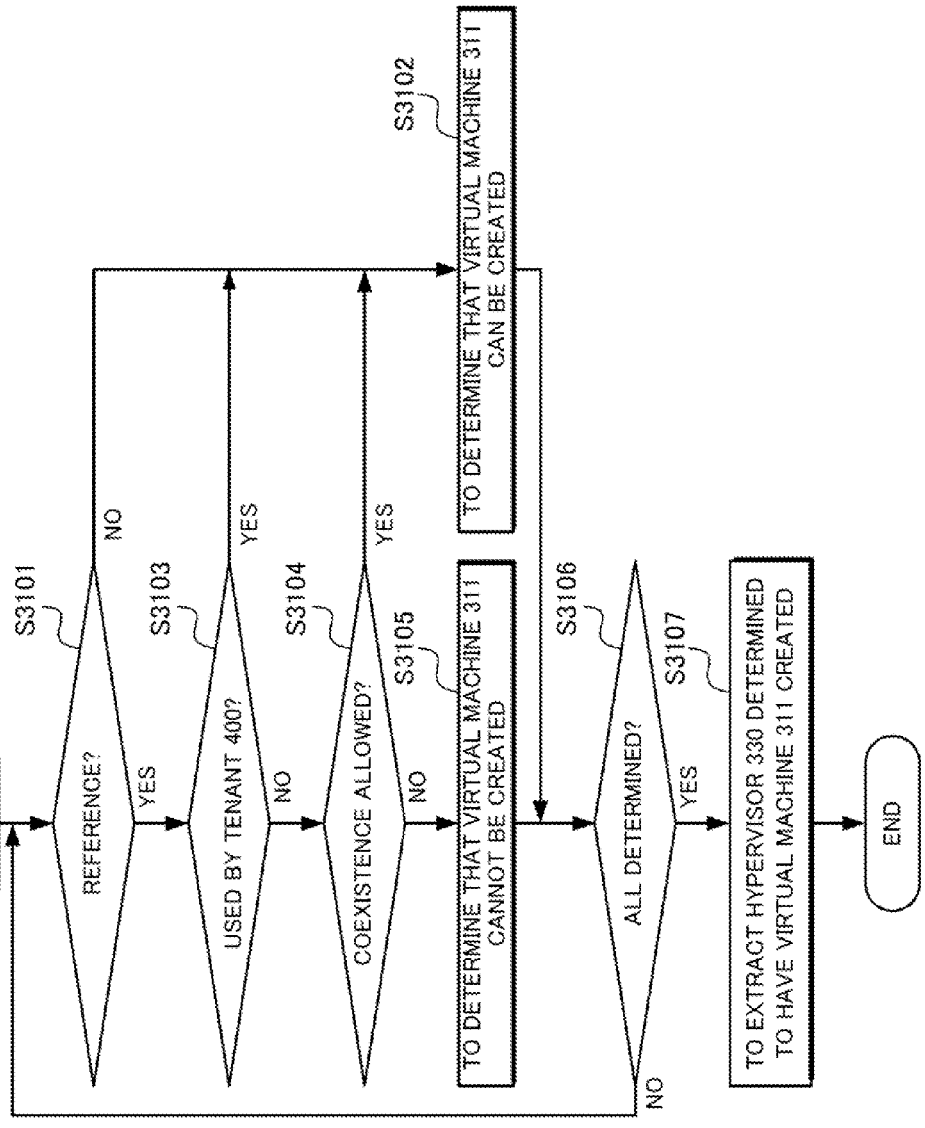
FIG. 31 is a flow chart showing operation of requesting virtual machine creation execution according to the first exemplary embodiment.

With reference to FIG. 31, first, the virtual machine creation management unit 204 determines whether the extracted hypervisor 330 is referred to by the virtual machine 311 (Step S3101).

When the hypervisor 330 is not referred to by the virtual machine 311 ("NO" at Step S3101), the virtual machine creation management unit 204 determines that the virtual machine 311 can be created in the hypervisor 330 (Step S3102).

When the hypervisor 330 is referred to by the virtual machine 311 ("YES" at Step S3101), the virtual machine creation management unit 204 determines whether the virtual machine 311 referring to the hypervisor 330 is a virtual machine used by the tenant A (Step S3103).

When determining that the virtual machine 311 is the virtual machine 331 used by the tenant A ("YES" at Step S3103), the virtual machine creation management unit 204 determines that the virtual machine 311 can be created in the hypervisor 330 (Step S3102).

When determining that the virtual machine 311 is not the virtual machine used by the tenant A ("NO" at Step S3103), the virtual machine creation management unit 204 then refers to the multi-tenant coexistence determination information of a license as requirement information to verify whether the virtual machine 331 to be created can coexist with the virtual machine 331 of other tenant 400 on the same hypervisor 330 (Step S3104).

When the multi-tenant coexistence determination information indicates "coexistence" ("YES" at Step S3104), the virtual machine creation management unit 204 determines that the virtual machine 311 can be created in the hypervisor 330 (Step S3102).

When the multi-tenant coexistence determination information indicates "coexistence not allowed" ("NO" at Step S3104), the virtual machine creation management unit 204 determines that the virtual machine 311 cannot be created in the hypervisor 330 (Step S3105).

The virtual machine creation management unit 204 executes the processing of Steps S3101 through S3105 with respect to all the hypervisors 330 extracted at the above-described Step S3011 (Step S3106).

After determining whether the virtual machine 311 can be created with respect to all the hypervisors 330 extracted at Step S3011 ("YES" at Step S3106), the virtual machine creation management unit 204 subsequently extracts the hypervisor 330 in which the virtual machine 311 can be created among the hypervisors 330 extracted at Step S3011 (Step S3107).

Assume here that all of the virtual machine A, the virtual machine B and the virtual machine C are virtual machines of the tenant 400 other than the tenant A.

As a result, since at Steps S3101 through S3107, the hypervisor A is referred to by other virtual machines A, B and C, and the virtual machines A, B and C are used by the tenant 400 other than the tenant A (the tenant terminal 410 of the tenant 400), it is not extracted. On the other hand, since the virtual machine 311 to be referred to fails to exist in the hypervisor C, the hypervisor C is resultantly extracted at Step S3107.

Here, back to FIG. 30, the virtual machine creation management unit 204 subsequently presents the hypervisor C to the system manager (Step S3012).

Next, when the hypervisor 330 in which the virtual machine 311 will be created is selected by the system manager from the presented hypervisors 330 (Step S3013), the virtual machine creation management unit 204 sends a request for execution of creation of the virtual machine 331 in the selected hypervisor 330 to the data center control unit 202 (Step S3014).

Here, while the system manager selects the hypervisor 330 as a creation destination at Step S3014, the selection can be realized automatically.

Possible is, for example, automatically selecting the hypervisor 330 whose number of already created virtual machines 331 is the smallest or automatically selecting the hypervisor 330 whose server specification (CPU) distribution per one virtual machine 331 is the largest.

When the hypervisor C is here selected by the system manager, the virtual machine creation management unit 204 sends a hypervisor C virtual machine creation execution request to the data center control unit 202.

The virtual machine creation execution request includes at least a creation destination hypervisor, a tenant to be used, a template to be used, a license to be used and a participating domain as requirement information.

More specifically, the virtual machine creation execution request sent at Step S3021 includes, as requirement information, "creation destination hypervisor "hypervisor C"", "a tenant to be used "tenant A"", "a template to be used "template A"", "a license to be used "license key "AAAA-AAAA-AAAA-AAAA", multi-tenant coexistence determination information "coexistence not allowed", expiration date "no limit", effective number "100"", "participating domain "path "ou=sales, o=tenant-a, c=jp", domain name "tenant-a-sales", and domain authentication information "UserName: Administrator, Password: AdminPasswd""".

Next, the data center control unit 204 having received the virtual machine creation execution request refers to the hypervisor included in the requirement information of the virtual machine creation execution request (Step S3015) and then extracts a manager name tied with the hypervisor name from the hypervisor information storage table 513 (Step S3016).

More specifically, the data center control unit 202 extracts the manager name "manager B" tied with the hypervisor name "hypervisor C". In other words, the manager B which manages the hypervisor C is extracted.

Next, the data center control unit 202 requests the manager B to create the virtual machine 331 (Step S3017).

More specifically, the data center control unit 202 sends the virtual machine creation execution request received from the virtual machine creation management unit 204 to the manager B.

Next, when the virtual machine 331 is created, the data center control unit 202 registers the virtual machine information of the created virtual machine 331 at the management data base 500 (Step S3018).

The virtual machine information includes at least a tenant name "tenant A", a hypervisor name "hypervisor C", a license key ""AAAA-AAAA-AAAA-AAAA", multi-tenant coexistence determination information "coexistence not allowed", expiration date "no limit" and effective number "100"".

Next, the storage unit 501 stores the registered virtual machine information in the virtual machine information storage table 523 (Step S3019).

At this time, the storage unit 501 stores the tenant name, the hypervisor name, and the license key, the multi-tenant coexistence determination information, the expiration date and the effective number in the form of reference to the tenant information storage table 516, the hypervisor information storage table 513 and the license information storage table 522, respectively.

(Effects of the First Exemplary Embodiment)

Next, effects of the present exemplary embodiment will be described.

Accordingly to the present exemplary embodiment, even when a hypervisor is shared by a plurality of tenants, creation destination hypervisors can be automatically selected according to a license for use in creating a virtual machine. This prevents a virtual machine created by a license which fails to allow coexistence with a virtual machine of other tenant from existing on the same hypervisor as that of the virtual machine of other tenant.

The present exemplary embodiment also enables, when a tenant user requests virtual machine creation, requirement information to be selected and presented to the tenant user based on resource information of a tenant already registered. This allows the tenant user to request creation of a virtual machine without taking physical location of other components than a data center into consideration.

Second Exemplary Embodiment

Next, detailed description will be made of a second exemplary embodiment of the present invention with reference to the drawings. In the following drawings, no description will be made of structures of components not related to the gist of the present invention and no illustration will be made thereof either.

The present exemplary embodiment has the following features in addition to the first exemplary embodiment.

In the present exemplary embodiment, the to-be-used hypervisor information includes hypervisor ownership, which is stored in the to-be-used hypervisor information storage table 520.

The hypervisor ownership has a value "borrow" or "own". "Borrow" represents that the tenant 400 fails to own the hypervisor 330 and borrows the same. "Own" represents that the tenant 400 owns the hypervisor 330.

Also in the present exemplary embodiment, the license includes hypervisor owner requirements, which are stored in the license information storage table 522.

The hypervisor owner requirements have values "borrow only", "own only" and "both allowed". "Borrow only" represents that the license can be used only when creating the virtual machine 331 in the borrowed hypervisor 330. "Own only" represents that the license can be used only when creating the virtual machine 331 in the owned hypervisor 330. "Both allowed" represents that the license can be used without being affected by hypervisor ownership.

Since other structures than those described above are the same as those of the first exemplary embodiment, no details will be described thereof.

(Description of Operation of the Second Exemplary Embodiment)

Next, operation of the DaaS system 100 according to the present exemplary embodiment will be detailed with reference to the drawings.

Description will be made of operation of registering resource information of the tenant 400 which uses the DaaS system 100 according to the present exemplary embodiment with reference to the drawings. Since operation of registering and operation of collecting and registering system structure information of the data center 300 are the same as those of the first exemplary embodiment, no details will be made thereof.

(Description of Operation of Registering Resource Information of the Tenant 400)

Operation of registering resource information of the tenant 400 which uses the DaaS system 100 according to the present exemplary embodiment will be described with reference to the drawings. In the following, no description will be made of a part which executes the same operation as that of the first exemplary embodiment.

Figure 32:
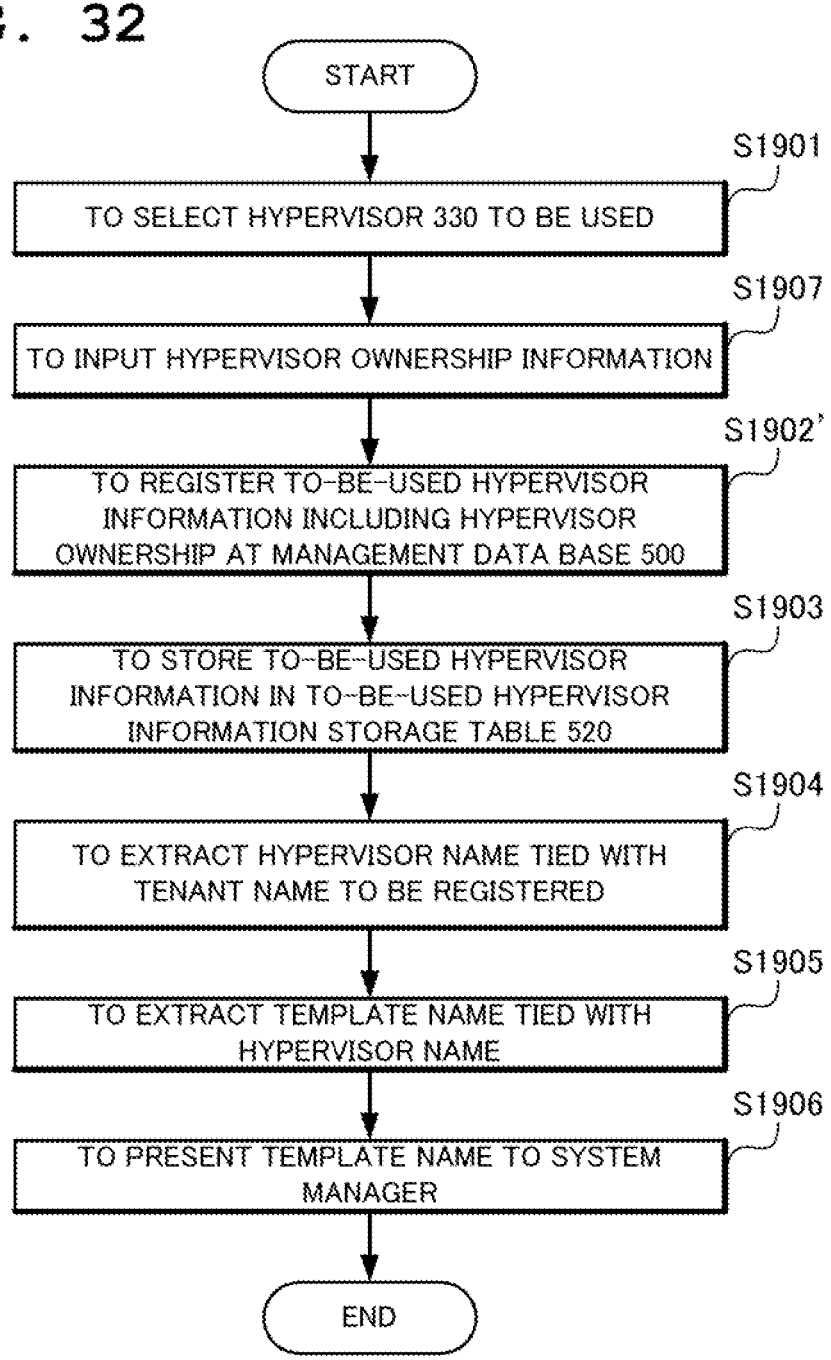
FIG. 32 is a flow chart showing operation of registering resource information of a tenant according to a second exemplary embodiment.

FIG. 32 is a flow chart showing operation of the tenant registration unit 203 according to the present exemplary embodiment to present the hypervisor 330 which can be used by the tenant A to the system manager. Shown in FIG. 32 is a result obtained by adding the operation of the present exemplary embodiment to the operation of the first exemplary embodiment shown in FIG. 19.

With reference to FIG. 32, in the present exemplary embodiment, the system manager selects the hypervisor 330 to be used by the tenant A based on the presented hypervisor information (Step S1901) and the system manager further inputs hypervisor ownership information set at the selected hypervisor 330 (Step S1907), and the tenant registration unit 203 registers the tenant name of the tenant A, the hypervisor name of the selected hypervisor 330 and the input hypervisor ownership so as to be correlated with each other as the to-be-used hypervisor information at the management data base 500 (Step S1902').

Assume here that the hypervisors 330 selected by the system manager are the hypervisors A, C and E.

Also assume that the hypervisor ownership information input by the system manager is "own" for the hypervisors A and C and "borrow" for the hypervisor E.

The registered to-be-used hypervisor information are accordingly "tenant A", "hypervisor A" and "own", "tenant A", "hypervisor C" and "own", and "tenant A", "hypervisor E" and "borrow".

Next, the storage unit 501 stores the to-be-used hypervisor information in the to-be-used hypervisor information storage table 520 (Step S1903). At this time, the storage unit 501 stores the tenant name and the hypervisor name in the form of reference to the tenant information storage table 516 and the hypervisor information storage table 513, respectively.

Shown here in FIG. 33 is an example of a structure of the to-be-used hypervisor information storage table 520 as of after Step S1903.

Since the processing to follow is the same as that of FIG. 19, no detailed description will be made thereof.

Figure 34:
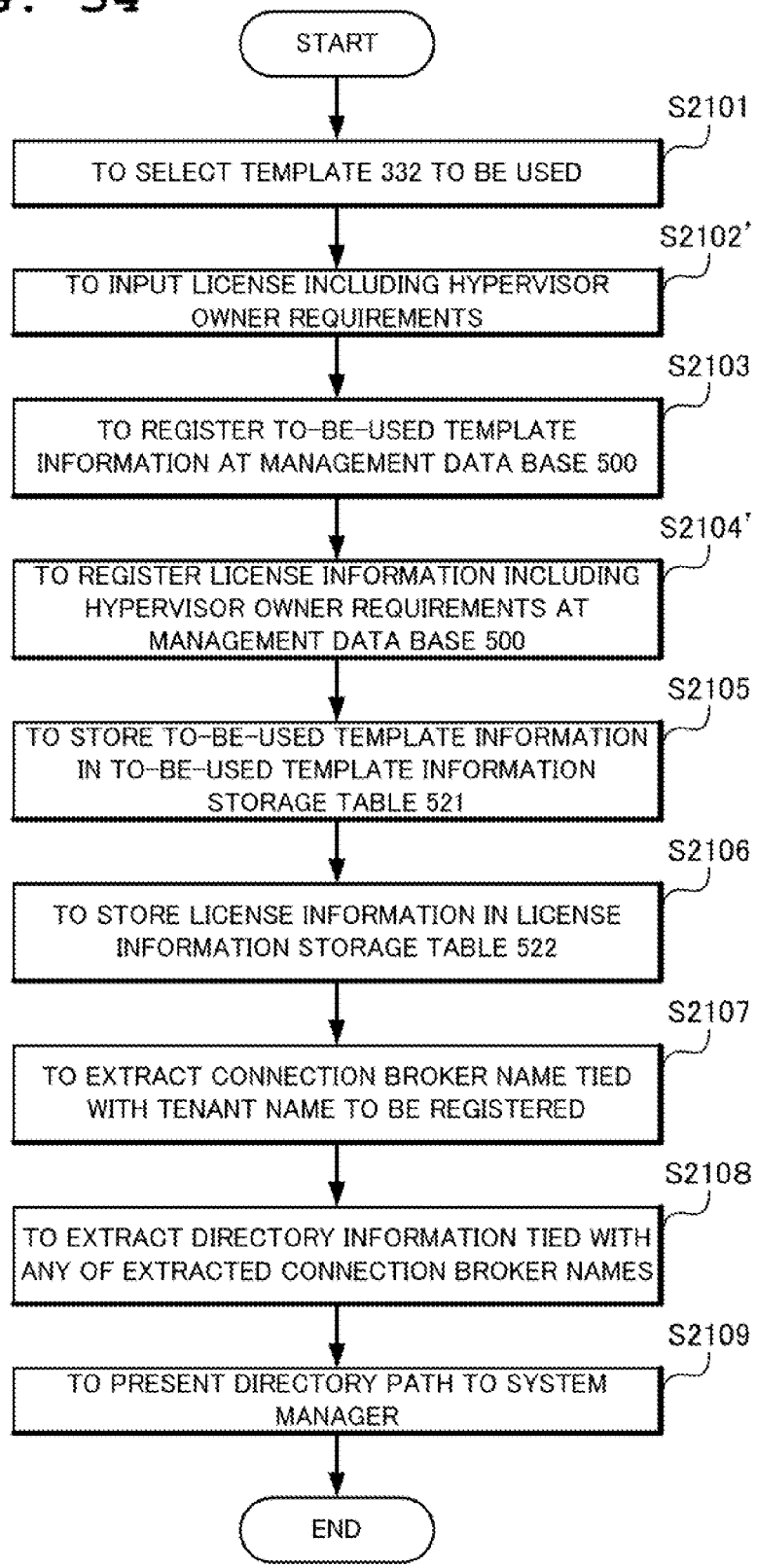
FIG. 34 is a flow chart showing operation of registering resource information of a tenant according to the second exemplary embodiment.

Next, FIG. 34 is a flow chart showing operation of the tenant registration unit 203 according to the present exemplary embodiment to present the directory information of the directory in which domain information of the tenant user of the tenant 400 can be registered to the system manager. Shown in FIG. 34 is a result obtained by adding the operation of the present exemplary embodiment to the operation of the first exemplary embodiment shown in FIG. 21.

In the present exemplary embodiment, when the system manager selects the template 332 to be used by the hypervisor 330 used by the tenant A based on the presented template information (Step S2101) and the system manager further inputs a license including hypervisor owner requirement which is used by the selected template 332 (Step S2102'), the tenant registration unit 203 registers the tenant name of the tenant A and the template name of the selected template 332 so as to be correlated with each other as the to-be-used template information at the management data base 500 (Step S2103), as well as registering the tenant name of the tenant A and the input license so as to be correlated with each other as license information at the management data base 500 (Step S2104').

Assume here that the templates 332 selected by the system manager are the templates A and B. The registered to-be-used template information will be accordingly "tenant A" and "template A", and "tenant A" and "template B".

Also assume that a license used by the template A input by the system manager is "license key "AAAA-AAAA-AAAA-AAAA", multi-tenant coexistence determination information "coexistence not allowed", expiration date "no limit", effective number "100" and hypervisor owner requirement "own only"" and a license used by the template B is "license key "BBBB-BBBB-BBBB-BBBB", multi-tenant coexistence determination information "coexistence allowed", expiration date "no limit", effective number "no limit" and hypervisor owner requirement "both allowed"".

The registered license information will be "tenant A" and "template A", and "license key "AAAA-AAAA-AAAA-AAAA", multi-tenant coexistence determination information "coexistence not allowed", expiration date "no limit", effective number "100" and hypervisor owner requirement "own only"", and "tenant A" and "template B", and "license key "BBBB-BBBB-BBBB-BBBB", multi-tenant coexistence determination information "coexistence allowed", expiration date "no limit", effective number "no limit" and hypervisor owner requirement "both allowed"".

Shown here in FIG. 35 is an example of a structure of the license information storage table 522 as of after Step S2106 according to the present exemplary embodiment.

Since the processing to follow is the same as that of FIG. 21, no detailed description will be made thereof.

(Description of Operation of Requesting Virtual Machine Creation)

Next, operation of the tenant terminal 410 of the tenant 400 to request virtual machine creation according to the present exemplary embodiment will be detailed with reference to the drawings. In the following, no description will be made of a part which executes the same operation as that of the first exemplary embodiment.

FIG. 36 is a flow chart showing operation of the virtual machine creation requesting unit 411 according to the present exemplary embodiment to present a license usable in creating the virtual machine 331 of the tenant A to the tenant user. Shown in FIG. 36 is a result obtained by adding the operation of the present exemplary embodiment to the operation of the first exemplary embodiment shown in FIG. 28.

With reference to FIG. 36, in the present exemplary embodiment, the virtual machine creation requesting unit 411 refers to the license information storage table 522 to extract a license (license key, multi-tenant coexistence determination information, expiration date, effective number and hypervisor owner requirements) tied with the extracted template names "template A" and "template B" (Step S2803').

Next, the virtual machine creation requesting unit 411 refers to the to-be-used hypervisor information storage table 520 to extract ownership information of the hypervisors A, C and E extracted at Step S2707 shown in FIG. 27.

As a result, extracted are ownership information "own" of the hypervisor A, ownership information "own" of the hypervisor C and ownership information "borrow" of the hypervisor E.

Next, the virtual machine creation requesting unit 411 compares the hypervisor ownerships of the hypervisors A, C and E extracted at Step S2805 and the hypervisor owner requirements of the license extracted at Step S2803', confirms that the ownership information of each hypervisor satisfies hypervisor owner requirements of the license and extracts a license including hypervisor owner requirements meeting the extracted hypervisor ownerships of the hypervisors A, C and E (Step S2806).

More specifically, since the hypervisor owner requirement of the selected license is "own only", the hypervisors A and C whose hypervisor ownership is "own" satisfy the requirements and are extracted.

Next, the virtual machine creation requesting unit 411 presents the extracted license to the tenant user (Step S2804).

(Description of Operation of Creating Virtual Machine)

Next, operation of the virtual machine creation according to the present exemplary embodiment will be detailed with reference to the drawings. In the following, no description will be made of a part which executes the same operation as that of the first exemplary embodiment.

Figure 37:
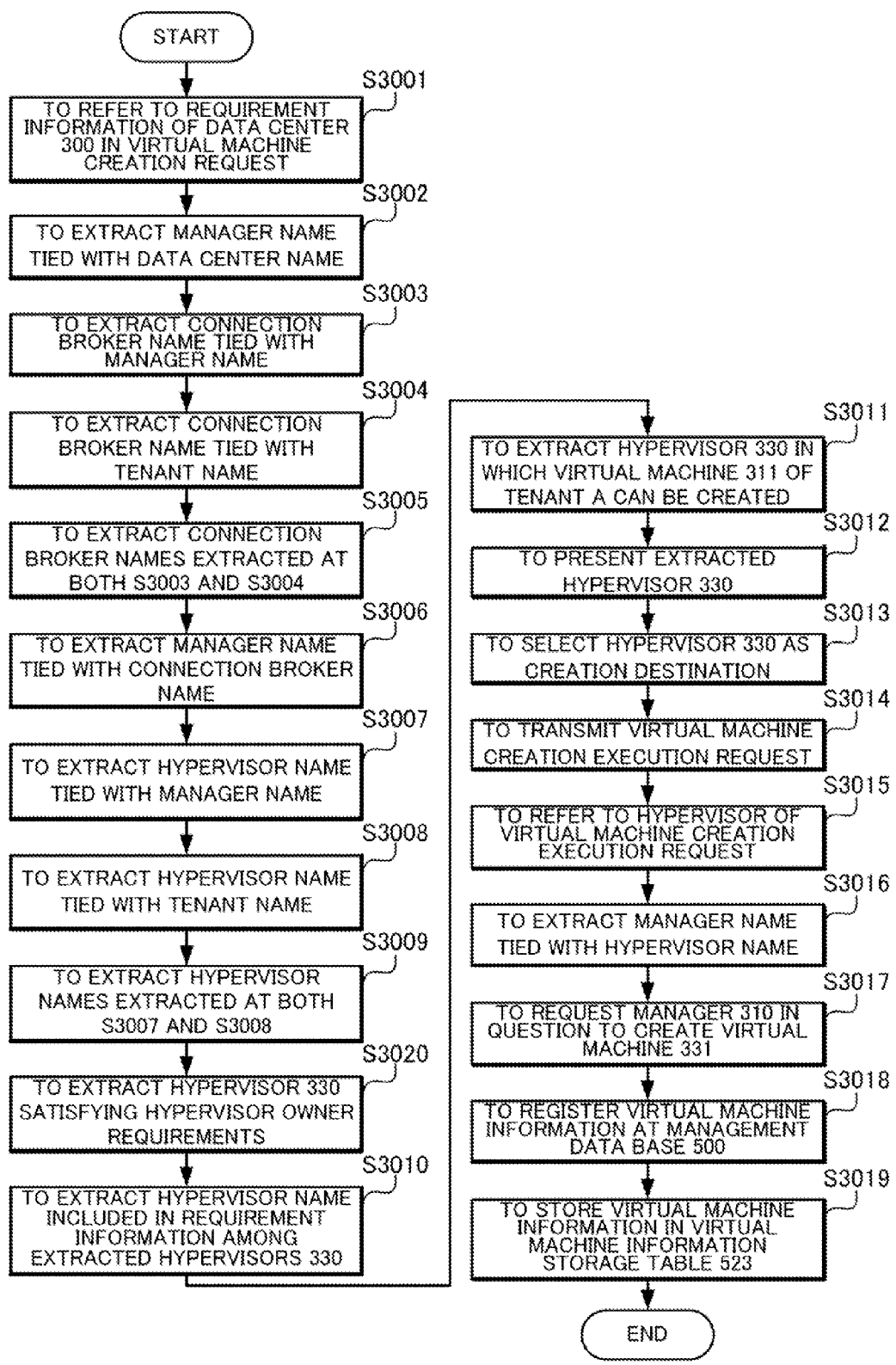
FIG. 37 is a flow chart showing operation of requesting virtual machine creation execution according to the second exemplary embodiment.

FIG. 37 is a flow chart showing operation of the virtual machine creation according to the present exemplary embodiment. Shown in FIG. 37 is a result obtained by adding the operation of the present exemplary embodiment to the operation of the first exemplary embodiment shown in FIG. 30.

In the present exemplary embodiment, after Step S3009, the virtual machine creation management unit 204 determines whether hypervisor ownership information of the hypervisors A and C extracted at Step S3009 satisfies hypervisor owner requirements of a license included in requirement information and extracts the hypervisor 330 which satisfies the hypervisor owner requirements (Step S3020).

Since the hypervisor owner requirement of the license included in the requirement information is "own only" and the hypervisor information of the hypervisors A and C is "own", both the hypervisors A and C satisfy the hypervisor owner requirements, so that they are extracted.

Since the processing to follow is the same as that of FIG. 30, no detailed description will be made thereof.

(Effects of the Second Exemplary Embodiment)

The present exemplary embodiment enables further selection of hypervisor information than by the first exemplary embodiment.

The reason is that by adding ownership information of the hypervisor 330 to be used and adding hypervisor owner requirements to a license, it is possible to automatically exclude the hypervisor 330 failing to satisfy the hypervisor owner requirements of the license from extraction targets.

Figure 38:
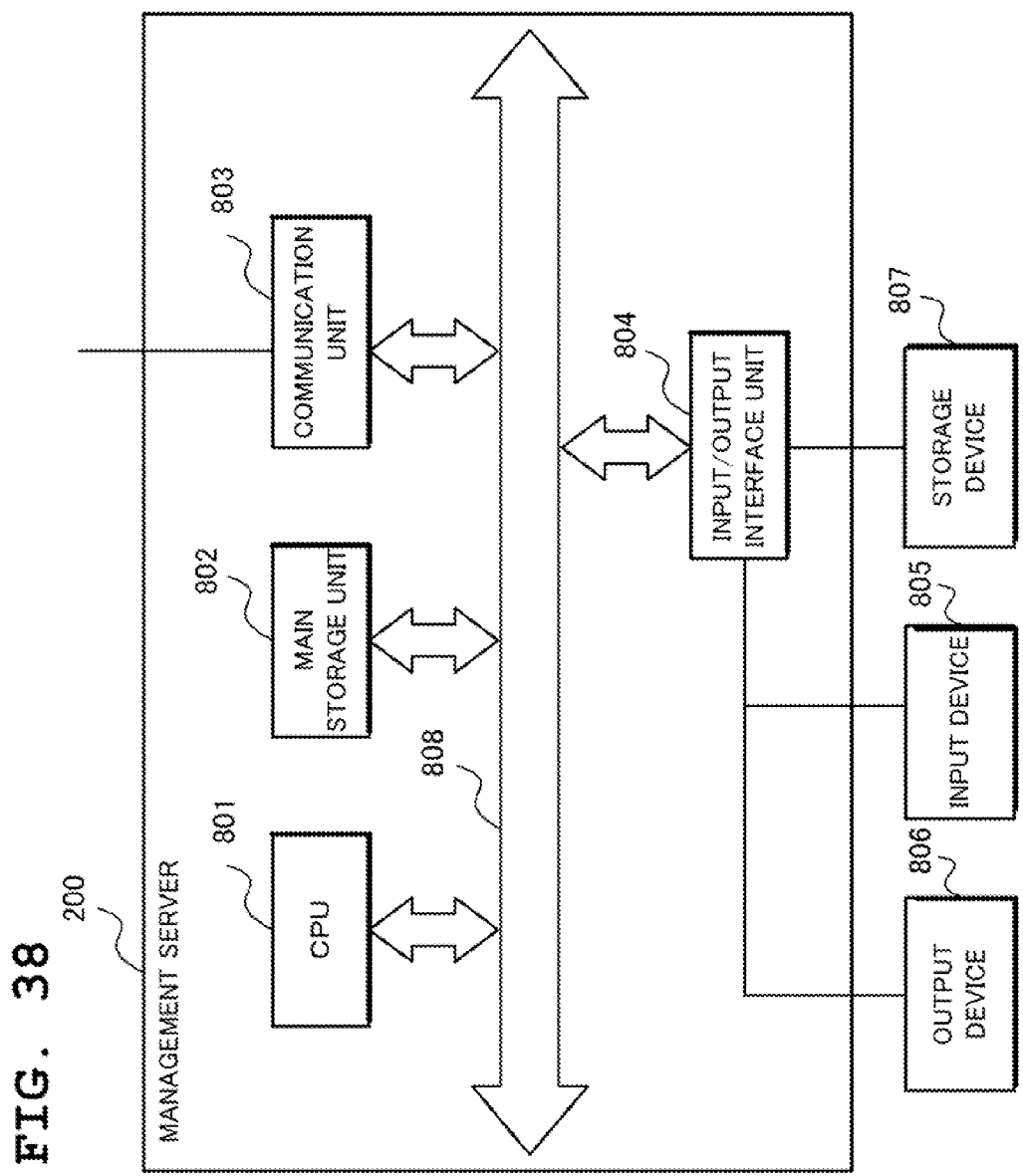
FIG. 38 is a block diagram showing an example of a hardware structure of a management server according to the present invention.

Next, an example of a hardware structure of the management server 200 according to the present invention will be described with reference to FIG. 38. FIG. 38 is a block diagram showing an example of a hardware structure of the management server 200.

With reference to FIG. 38, the management server 200, which has the same hardware structure as that of a common computer device, comprises a CPU (Central Processing Unit) 801, a main storage unit 802 formed of a memory such as a RAM (Random Access Memory) for use as a data working region or a data temporary saving region, a communication unit 803 which transmits and receives data through a network, an input/output interface unit 804 connected to an input device 805, an output device 806 and a storage device 807 to transmit and receive data, and a system bus 808 which connects the above-described respective components with each other. The storage device 807 is realized by, for example, a hard disk device formed of a non-volatile memory such as a ROM (Read Only Memory), a magnetic disk or a semiconductor memory.

The data center registration unit 201, the data center control unit 202, the tenant registration unit 203 and the virtual machine creation management unit 204 of the management server 200 according to the present invention have their operation realized not only in hardware by mounting a circuit part which is a hardware part such as an LSI (Large Scale Integration) with a program incorporated but also in software by storing a program which provides the functions in the storage device 807, loading the program into the main storage unit 802 and executing the same by the CPU 801.

The tenant terminal 410 also has such a hardware structure as described above and each function that the tenant terminal 410 has can be realized in hardware or software.

Although the present invention has been described with respect to the preferred exemplary embodiments in the foregoing, the present invention is not necessarily limited to the above-described exemplary embodiments and can be implemented in various modifications within the scope of its technical idea.

An arbitrary combination of the foregoing components and conversion of representation of the present invention among a method, a device, a system, a recording medium, a computer program and the like are also effective as a mode of the present invention.

The respective components of the present invention need not exist independently, and the plurality of the components may be formed as one member, one component may be formed of a plurality of members, a certain component may be a part of other component, a part of a certain component and a part of other component may overlap with each other or the like.

In addition, although the method and the computer program of the present invention have a plurality of procedures recited in order, the order of recitation does not limit the order of execution of the plurality of procedures. Accordingly, when executing the method and the computer program of the present invention, the order of the plurality of procedures can be changed within the range not hindering the contents.

Moreover, the plurality of procedures of the method and the computer program of the present invention are not limited to execution at different timing with each other. Therefore, during execution of a certain procedure, other procedure might occur, a part or all of execution timing of a certain procedure and execution timing of other procedure might overlap with each other, or the like.

The whole or part of the exemplary embodiments disclosed above can be described as, but not limited to, the following supplementary notes.

(Supplementary note 1) A virtual machine creation system, comprising:

at least one tenant including at least one tenant terminal;

a management data base which stores resource information of the tenant, at least one data center in which a virtual machine to be used by the tenant operates; and a management server including a virtual machine creation management unit which selects a hypervisor in which the virtual machine can be created based on resource information of the tenant stored in the management data base and a virtual machine creation request including predetermined requirement information for creating the virtual machine which is received from the tenant terminal.

(Supplementary note 2) The virtual machine creation system according to supplementary note 1, wherein the tenant terminal comprises a virtual machine creation requesting unit which makes the virtual machine creation request, and wherein the virtual machine creation requesting unit includes, in the requirement information of the virtual machine creation request, a data center as a creation destination of the virtual machine, a template for use in creating the virtual machine, a license for use in creating the virtual machine and a domain of a tenant user of the tenant, and the virtual machine creation management unit of the management server extracts a data center which is a data center included in the requirement information and usable by the tenant from the management data base, extracts a connection broker related to a manager related to the extracted data center and usable by the tenant from the management data base, extracts the hypervisor related to a manager related to the extracted connection broker and usable by the tenant from the management data base, and extracts the hypervisor included in the requirement information and in which the virtual machine of the tenant can be created from among the extracted hypervisors.

(Supplementary note 3) The virtual machine creation system according to supplementary note 2, wherein the virtual machine creation requesting unit of the tenant terminal extracts the data center usable by the tenant from the management data base, extracts a template for use in creating the virtual machine based on the data center selected as a creation destination of the virtual machine from among the extracted data centers and the resource information of the tenant, extracts a license for use in creating the virtual machine based on the extracted template and the resource information of the tenant, extracts a domain usable by the tenant based on the resource information of the tenant, and includes the domain selected as a domain to be used from among the extracted domains, the extracted data center, the extracted template, and the extracted license in the virtual machine creation request.

(Supplementary note 4) The virtual machine creation system according to supplementary note 2 or supplementary note 3, wherein a license for use in creating the virtual machine includes multi-tenant coexistence determination information indicating whether the virtual machines of a plurality of the tenants are allowed to coexist on the same hypervisor, and the virtual machine creation management unit of the management server when the hypervisor is referred to by other virtual machine, determines whether other the virtual machine is a virtual machine to be used by the tenant, when determination is made that the other virtual machine is a virtual machine to be used by other tenant than the tenant, verifies multi-tenant coexistence determination information of a license for use in creating the virtual machine, and when the multi-tenant coexistence determination information is "coexistence not allowed", determines that the virtual machine cannot be created in the hypervisor.

(Supplementary note 5) The virtual machine creation system according to any one of supplementary note 2 through supplementary note 4, wherein information of a license stored in the management data base includes an effective number of licenses, and the virtual machine creation requesting unit of the tenant terminal includes a license whose number of references is less than the effective number of licenses in the requirement information.

(Supplementary note 6) The virtual machine creation system according to any of supplementary note 1 through supplementary note 5, wherein the management server comprises a data center control unit which creates the virtual machine based on an instruction of the virtual machine creation management unit, and wherein based on a hypervisor selected by the virtual machine creation management unit and resource information of the tenant received from the virtual machine creation management unit, the data center control unit requests a manager related to the selected hypervisor to create the virtual machine.

(Supplementary note 7) The virtual machine creation system according to supplementary note 6, wherein the management server includes a data center registration unit which registers system structure information of the data center, and the data center control unit obtains manager information of the data center, connection broker information, hypervisor information, template information and directory information based on a request from the data center registration unit.

(Supplementary note 8) The virtual machine creation system according to any of supplementary note 2 through supplementary note 6, wherein information of a license stored in the management data base includes a hypervisor owner requirement, information of a hypervisor stored in the management data base includes a hypervisor ownership, the virtual machine creation requesting unit of the tenant terminal includes, in the virtual machine creation request, the license including the hypervisor owner requirement meeting the ownership of a hypervisor usable by the tenant, and the virtual machine creation management unit extracts the hypervisor satisfying the hypervisor owner requirement of the requirement information.

(Supplementary note 9) A management server of a virtual machine creation system, comprising:

a virtual machine creation management unit which, based on resource information of at least one tenant including at least one tenant terminal stored in a management data base of the virtual machine creation system and a virtual machine creation request including predetermined requirement information for creating a virtual machine to be used by the tenant on a data center of the virtual machine creation system which is received from the tenant terminal, selects a hypervisor in which the virtual machine can be created.

(Supplementary note 10) The management server according to supplementary note 9, wherein the requirement information of the virtual machine creation request from the tenant terminal includes a data center as a creation destination of the virtual machine, a template for use in creating the virtual machine, a license for use in creating the virtual machine and a domain of a tenant user of the tenant, and the virtual machine creation management unit of the management server extracts a data center which is a data center included in the requirement information and usable by the tenant from the management data base, extracts a connection broker related to a manager related to the extracted data center and usable by the tenant from the management data base, extracts the hypervisor related to a manager related to the extracted connection broker and usable by the tenant from the management data base, and extracts the hypervisor included in the requirement information and in which the virtual machine of the tenant can be created from among the extracted hypervisors.

(Supplementary note 11) The management server according to supplementary note 10, wherein a license for use in creating the virtual machine includes multi-tenant coexistence determination information indicating whether the virtual machines of a plurality of the tenants are allowed to coexist on the same hypervisor, and the virtual machine creation management unit of the management server when the hypervisor is referred to by other virtual machine, determines whether other the virtual machine is a virtual machine to be used by the tenant, when determination is made that the other virtual machine is a virtual machine to be used by other tenant than the tenant, verifies multi-tenant coexistence determination information of a license for use in creating the virtual machine, and when the multi-tenant coexistence determination information is "coexistence not allowed", determines that the virtual machine cannot be created in the hypervisor.

(Supplementary note 12) The management server according to supplementary note 10 or supplementary note 11, wherein information of a license stored in the management data base includes an effective number of licenses, and the requirement information from the tenant terminal includes a license whose number of references is less than the effective number of licenses.

(Supplementary note 13) The management server according to any of supplementary note 9 through supplementary note 12, further comprises a data center control unit which creates the virtual machine based on an instruction of the virtual machine creation management unit, and wherein based on a hypervisor selected by the virtual machine creation management unit and resource information of the tenant received from the virtual machine creation management unit, the data center control unit requests a manager related to the selected hypervisor to create the virtual machine.

(Supplementary note 14) The management server according to supplementary note 13, further comprises a data center registration unit which registers system structure information of the data center, and the data center control unit obtains manager information of the data center, connection broker information, hypervisor information, template information and directory information based on a request from the data center registration unit.

(Supplementary note 15) The management server according to any of supplementary note 10 through supplementary note 14, wherein information of a license stored in the management data base includes a hypervisor owner requirement, information of a hypervisor stored in the management data base includes a hypervisor ownership, the requirement information of the virtual machine creation request includes the license including the hypervisor owner requirement meeting the ownership of a hypervisor usable by the tenant, and the virtual machine creation management unit extracts the hypervisor satisfying the hypervisor owner requirement of the requirement information.

(Supplementary note 16) A virtual machine creation management method, comprising:

at a management server of a virtual machine creation system, a virtual machine creation management step of, based on resource information of at least one tenant including at least one tenant terminal stored in a management data base of the virtual machine creation system and a virtual machine creation request including predetermined requirement information for creating a virtual machine to be used by the tenant on a data center of the virtual machine creation system which is received from the tenant terminal, selecting a hypervisor in which the virtual machine can be created.

(Supplementary note 17) The virtual machine creation management method according to supplementary note 16, wherein the requirement information of the virtual machine creation request from the tenant terminal includes a data center as a creation destination of the virtual machine, a template for use in creating the virtual machine, a license for use in creating the virtual machine and a domain of a tenant user of the tenant, and at the virtual machine creation management step, extracts a data center which is a data center included in the requirement information and usable by the tenant from the management data base, extracts a connection broker related to a manager related to the extracted data center and usable by the tenant from the management data base, extracts the hypervisor related to a manager related to the extracted connection broker and usable by the tenant from the management data base, and extracts the hypervisor included in the requirement information and in which the virtual machine of the tenant can be created from among the extracted hypervisors.

(Supplementary note 18) The virtual machine creation management method according to supplementary note 17, wherein a license for use in creating the virtual machine includes multi-tenant coexistence determination information indicating whether the virtual machines of a plurality of the tenants are allowed to coexist on the same hypervisor, and at the virtual machine creation management step, when the hypervisor is referred to by other virtual machine, determines whether other the virtual machine is a virtual machine to be used by the tenant, when determination is made that the other virtual machine is a virtual machine to be used by other tenant than the tenant, verifies multi-tenant coexistence determination information of a license for use in creating the virtual machine, and when the multi-tenant coexistence determination information is "coexistence not allowed", determines that the virtual machine cannot be created in the hypervisor.

(Supplementary note 19) The virtual machine creation management method according to supplementary note 17 or supplementary note 18, wherein information of a license stored in the management data base includes an effective number of licenses, and the requirement information from the tenant terminal includes a license whose number of references is less than the effective number of licenses.

(Supplementary note 20) The virtual machine creation management method according to any of supplementary note 16 through supplementary note 19, further comprises a data center control step of creating the virtual machine based on an instruction from the virtual machine creation management step, and wherein at the data center control step, based on a hypervisor selected by the virtual machine creation management step and resource information of the tenant received from the virtual machine creation management step, requests a manager related to the selected hypervisor to create the virtual machine.

(Supplementary note 21) The virtual machine creation management method according to supplementary note 20, further comprises a data center registration step of registering system structure information of the data center, and at the data center control step, obtains manager information of the data center, connection broker information, hypervisor information, template information and directory information based on a request from the data center registration step.

(Supplementary note 22) The virtual machine creation management method according to any of supplementary note 17 through supplementary note 21, wherein information of a license stored in the management data base includes a hypervisor owner requirement, information of a hypervisor stored in the management data base includes a hypervisor ownership, the requirement information of the virtual machine creation request includes the license including the hypervisor owner requirement meeting the ownership of a hypervisor usable by the tenant, and at the virtual machine creation management step, extracts the hypervisor satisfying the hypervisor owner requirement of the requirement information.

(Supplementary note 23) A computer readable medium storing a virtual machine creation management program executed on a management server of a virtual machine creation system, wherein the program causes the management server to execute the processing of:

a virtual machine creation management processing of, based on resource information of at least one tenant including at least one tenant terminal stored in a management data base of the virtual machine creation system and a virtual machine creation request including predetermined requirement information for creating a virtual machine to be used by the tenant on a data center of the virtual machine creation system which is received from the tenant terminal, selecting a hypervisor in which the virtual machine can be created.

(Supplementary note 24) The non-transitory computer readable medium according to supplementary note 23, wherein the requirement information of the virtual machine creation request from the tenant terminal includes a data center as a creation destination of the virtual machine, a template for use in creating the virtual machine, a license for use in creating the virtual machine and a domain of a tenant user of the tenant, and at the virtual machine creation management processing, extracts a data center which is a data center included in the requirement information and usable by the tenant from the management data base, extracts a connection broker related to a manager related to the extracted data center and usable by the tenant from the management data base, extracts the hypervisor related to a manager related to the extracted connection broker and usable by the tenant from the management data base, and extracts the hypervisor included in the requirement information and in which the virtual machine of the tenant can be created from among the extracted hypervisors.

(Supplementary note 25) The non-transitory computer readable medium according to supplementary note 24, wherein a license for use in creating the virtual machine includes multi-tenant coexistence determination information indicating whether the virtual machines of a plurality of the tenants are allowed to coexist on the same hypervisor, and at the virtual machine creation management processing, when the hypervisor is referred to by other virtual machine, determines whether other the virtual machine is a virtual machine to be used by the tenant, when determination is made that the other virtual machine is a virtual machine to be used by other tenant than the tenant, verifies multi-tenant coexistence determination information of a license for use in creating the virtual machine, and when the multi-tenant coexistence determination information is "coexistence not allowed", determines that the virtual machine cannot be created in the hypervisor.

(Supplementary note 26) The non-transitory computer readable medium according to supplementary note 24 or supplementary note 25, wherein information of a license stored in the management data base includes an effective number of licenses, and the requirement information from the tenant terminal includes a license whose number of references is less than the effective number of licenses.

(Supplementary note 27) The non-transitory computer readable medium according to any of supplementary note 23 through supplementary note 26, further comprises a data center control processing of creating the virtual machine based on an instruction from the virtual machine creation management processing, and wherein at the data center control processing, based on a hypervisor selected by the virtual machine creation management processing and resource information of the tenant received from the virtual machine creation management processing, requests a manager related to the selected hypervisor to create the virtual machine.

(Supplementary note 28) The non-transitory computer readable medium according to supplementary note 27, further comprises a data center registration processing of registering system structure information of the data center, and at the data center control processing, obtains manager information of the data center, connection broker information, hypervisor information, template information and directory information based on a request from the data center registration processing.

(Supplementary note 29) The non-transitory computer readable medium according to any of supplementary note 24 through supplementary note 28, wherein information of a license stored in the management data base includes a hypervisor owner requirement, information of a hypervisor stored in the management data base includes a hypervisor ownership, the requirement information of the virtual machine creation request includes the license including the hypervisor owner requirement meeting the ownership of a hypervisor usable by the tenant, and at the virtual machine creation management processing, extracts the hypervisor satisfying the hypervisor owner requirement of the requirement information.

What is claimed is:

1. A virtual machine creation system, comprising:
   at least one tenant terminal;
   a management data base which stores resource information of said tenant terminal;
   at least one data center in which a virtual machine to be used by said tenant terminal operates; and
   a virtual machine creation management server including at least one processor and a virtual machine creation management unit which selects a hypervisor in which said virtual machine can be created based on resource information of said tenant terminal stored in said management data base and a virtual machine creation request including predetermined requirement information for creating said virtual machine which is received from said tenant terminal, wherein
   said tenant terminal comprises a virtual machine creation requesting unit which makes said virtual machine creation request,
   and wherein said virtual machine creation requesting unit includes, in said predetermined requirement information of said virtual machine creation request, a data center as a creation destination of said virtual machine, a template for use in creating said virtual machine, a license for use in creating said virtual machine and a domain of a tenant user of said tenant, said virtual machine creation management unit of said virtual machine creation management server extracts a data center which is a data center included in said predetermined requirement information and usable by said tenant terminal from said management data base, extracts a connection broker related to a manager related to said extracted data center and usable by said tenant terminal from said management data base, extracts said hypervisor related to a manager related to said extracted connection broker and usable by said tenant terminal from said management data base, and extracts said hypervisor included in said predetermined requirement information and in which said virtual machine of said tenant terminal can be created from among said extracted hypervisor.

2. The virtual machine creation system according to claim 1, wherein said virtual machine creation requesting unit of said tenant terminal extracts said data center usable by said tenant terminal from said management data base, extracts a template for use in creating said virtual machine based on said data center selected as a creation destination of said virtual machine from among said extracted data centers and said resource information of said tenant terminal, extracts a license for use in creating said virtual machine based on said extracted template and said resource information of said tenant terminal, extracts a domain usable by said tenant terminal based on said resource information of said tenant terminal, and includes said domain selected as a domain to be used from among said extracted domains, said extracted data center, said extracted template, and said extracted license in said virtual machine creation request.

3. The virtual machine creation system according to claim 1, wherein a license for use in creating said virtual machine includes multi-tenant terminal coexistence determination information indicating whether said virtual machines of a plurality of said tenant terminals are allowed to coexist on the same hypervisor, and said virtual machine creation management unit of said virtual machine creation management server when said hypervisor is referred to by other virtual machine, determines whether other said virtual machine is a virtual machine to be used by said tenant terminal, when determination is made that said other virtual machine is a virtual machine to be used by other tenant terminal than said tenant terminal, verifies multi-tenant terminal coexistence determination information of a license for use in creating said virtual machine, and when said multi-tenant terminal coexistence determination information is "coexistence not allowed", determines that said virtual machine cannot be created in said hypervisor.

4. The virtual machine creation system according to claim 1, wherein information of a license stored in said management data base includes an effective number of licenses, and said virtual machine creation requesting unit of said tenant terminal includes a license whose number of references is less than said effective number of licenses in said predetermined requirement information.

5. The virtual machine creation system according to claim 1, wherein said virtual machine creation management server comprises a data center control unit which creates said virtual machine based on an instruction of said virtual machine creation management unit, and wherein based on a hypervisor selected by said virtual machine creation management unit and resource information of said tenant terminal received from said virtual machine creation management unit, said data center control unit requests a manager related to said selected hypervisor to create said virtual machine.

6. The virtual machine creation system according to claim 1, wherein information of a license stored in said management data base includes a hypervisor owner requirement, information of a hypervisor stored in said management data base includes a hypervisor ownership, said virtual machine creation requesting unit of said tenant terminal includes, in said virtual machine creation request, said license including said hypervisor owner requirement meeting said ownership of a hypervisor usable by said tenant terminal, and said virtual machine creation management unit extracts said hypervisor satisfying said hypervisor owner requirement of said requirement information.

7. A virtual machine creation management server of a virtual machine creation system, comprising:

at least one processor; and a virtual machine creation management unit which, based on resource information of at least one tenant terminal stored in a management data base of said client virtual machine creation system and a virtual machine creation request including predetermined requirement information including a data center as a creation destination of said virtual machine, a template for use in creating said virtual machine, a license for use in creating said virtual machine and a domain of a tenant user of said tenant terminal, for creating a virtual machine to be used by said tenant terminal on a data center of said thin virtual machine creation system which is received from said tenant terminal, selects a hypervisor in which said virtual machine can be created, said virtual machine creation management unit of said virtual machine creation management server extracts a data center which is a data center included in said predetermined requirement information and usable by said tenant terminal from said management data base, extracts a connection broker related to a manager related to said extracted data center and usable by said tenant terminal from said management data base, extracts said hypervisor related to a manager related to said extracted connection broker and usable by said tenant terminal from said management data base, and extracts said hypervisor included in said predetermined requirement information and in which said virtual machine of said tenant terminal can be created from among said extracted hypervisor.

8. A virtual machine creation management method, comprising:

at a virtual machine creation management server of a client virtual machine creation system, a virtual machine creation management step of, based on resource information at least one tenant terminal stored in a management data base of said virtual machine creation system and a virtual machine creation request including predetermined requirement information including a data center as a creation destination of said virtual machine, a template for use in creating said virtual machine, a license for use in creating said virtual machine and a domain of a tenant user of said tenant terminal, for creating a virtual machine to be used by said tenant terminal on a data center of said thin virtual machine creation system which is received from said tenant terminal, selecting a hypervisor in which said virtual machine can be created, said virtual machine creation management of said virtual machine creation management server extracts a data center which is a data center included in said predetermined requirement information and usable by said tenant terminal from said management data base, extracts a connection broker related to a manager related to said extracted data center and usable by said tenant terminal from said management data base, extracts said hypervisor related to a manager related to said extracted connection broker and usable by said tenant terminal from said management data base, and extracts said hypervisor included in said predetermined requirement information and in which said virtual machine of said tenant terminal can be created from among said extracted hypervisor.

9. A non-transitory computer readable medium storing a virtual machine creation management program executed on a virtual machine creation management server of a thin virtual machine creation system, wherein said program causes said virtual machine creation management server to execute the functions of:

a virtual machine creation management processing of, based on resource information of at least one tenant terminal stored in a management data base of said virtual machine creation system and a virtual machine creation request including predetermined requirement information including a data center as a creation destination of said virtual machine, a template for use in creating said virtual machine, a license for use in creating said virtual machine and a domain of a tenant user of said tenant terminal, for creating a virtual machine to be used by said tenant terminal on a data center of said virtual machine creation system which is received from said tenant terminal, selecting a hypervisor in which said virtual machine can be created, said virtual machine creation management of said virtual machine creation management server extracts a data center which is a data center included in said predetermined requirement information and usable by said tenant terminal from said management data base, extracts a connection broker related to a manager related to said extracted data center and usable by said tenant terminal from said management data base, extracts said hypervisor related to a manager related to said extracted connection broker and usable by said tenant terminal from said management data base, and extracts said hypervisor included in said predetermined requirement information and in which said virtual machine of said tenant terminal can be created from among said extracted hypervisor.

\* \* \* \* \*